US010535065B2

(12) United States Patent
Muftic

(10) Patent No.: US 10,535,065 B2
(45) Date of Patent: Jan. 14, 2020

(54) SECURE PAYMENT TRANSACTIONS BASED ON THE PUBLIC BANKCARD LEDGER

(71) Applicant: Business Information Exchange System Corp., Rockville, MD (US)

(72) Inventor: Sead Muftic, Rockville, MD (US)

(*) Notice: Subject to any disclaimer, the term of this patent is extended or adjusted under 35 U.S.C. 154(b) by 356 days.

(21) Appl. No.: 15/180,014

(22) Filed: Jun. 11, 2016

(65) Prior Publication Data

US 2017/0357970 A1    Dec. 14, 2017

(51) Int. Cl.
| | |
|---|---|
| G06Q 40/00 | (2012.01) |
| G06Q 20/40 | (2012.01) |
| G06Q 20/26 | (2012.01) |
| G06Q 20/24 | (2012.01) |
| G06Q 20/38 | (2012.01) |
| G06Q 20/20 | (2012.01) |

(52) U.S. Cl.
CPC .......... G06Q 20/401 (2013.01); G06Q 20/20 (2013.01); G06Q 20/24 (2013.01); G06Q 20/26 (2013.01); G06Q 20/3829 (2013.01)

(58) Field of Classification Search
CPC ...... G06Q 20/10; G06Q 20/40; G06Q 20/102; G06Q 20/12
USPC ........................................................ 235/379
See application file for complete search history.

(56) References Cited

U.S. PATENT DOCUMENTS 6,138,107 A * 10/2000 Elgamal ................. G06Q 20/00
235/379

OTHER PUBLICATIONS

Biella, M., et al. "Blockchain Technology and Applications from a Financial Perspective", InlCredit Bank, Feb. 26, 2016.
Brands, S., "Untraceable Off-line Cash in Wallets with Observers", Advances in Cryptology, Crypto '93, LNCS 773, Springer-Verlag, pp. 302-318.
Chaum, D., "Security without identification: transactions system to make big brother obsolete", CACM, 1985.
De Santis, A., et al., "Communication Efficient Zero-Knowledge Proofs of Knowledge (with Applications to Electronic Cash)", Proceedings of STACS '92, LNCS 577, Springer-Verlag, pp. 89-105.
Okamoto, T., et al., "Disposable Zero-Knowledge Authentication and Their Application to Untraceable Cash", Advances in Cryptology, Crypto '89, LNCS 435, Springer-Verlag, pp. 134-149.

(Continued)

Primary Examiner — Jamara A Franklin
(74) Attorney, Agent, or Firm — Morris, Manning & Martin, LLP; Daniel E. Sineway, Esq.; Daniel T. Begasse

(57) ABSTRACT

A system for bankcard payments, wherein payments are peer-to-peer transactions between the cardholder and merchant without participation from any third party. The system uses standard bankcards and supports both debit and credit card payments. For authorization of payments the system uses a special, global, distributed, append-only, and secure public bankcard ledger. The entries in the ledger are virtual accounts used for bankcard payments, organized into account chains. The system provides security, privacy, anonymity, and untraceability for cardholders and their transactions. The system allows for various users of the system to participate in transactions using preexisting payment systems. In one embodiment, specially designed mobile software modules and an innovative payment protocol all for transactions to be made between users.

17 Claims, 13 Drawing Sheets

Components and Protocols of the Standard Bankcard Payment System

(56) References Cited

OTHER PUBLICATIONS

Poon, J. at al., "The Bitcoin lightning network: Scalable off-chain instant payments", Technical report, 2015. URL https: //lightning.network/lightning-network-paper.pdf.
Sasson, E.B., at al. Zerocash: Decentralized ananymous payments from bitcoin. In Security and Privacy (SP), 2014 IEEE Symposium on, pp. 459(474, IEEE, 2014.
Walport, M., (Ed.) "Distibuted Ledger Technology: beyond blockchain", UK Government, Office of Science, Report, Dec. 2015.

* cited by examiner

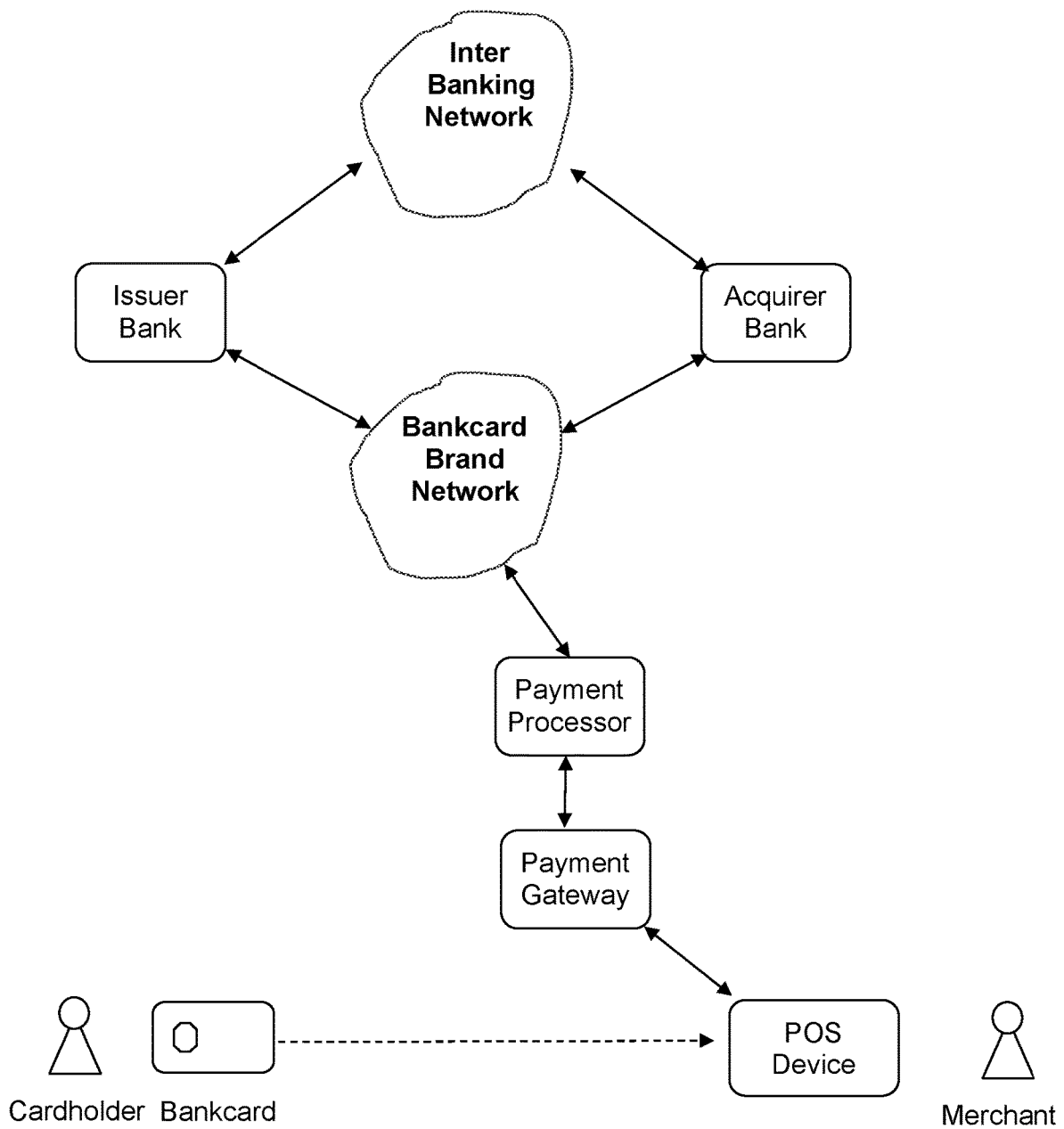
FIG 1: Components and Protocols of the Standard Bankcard Payment System

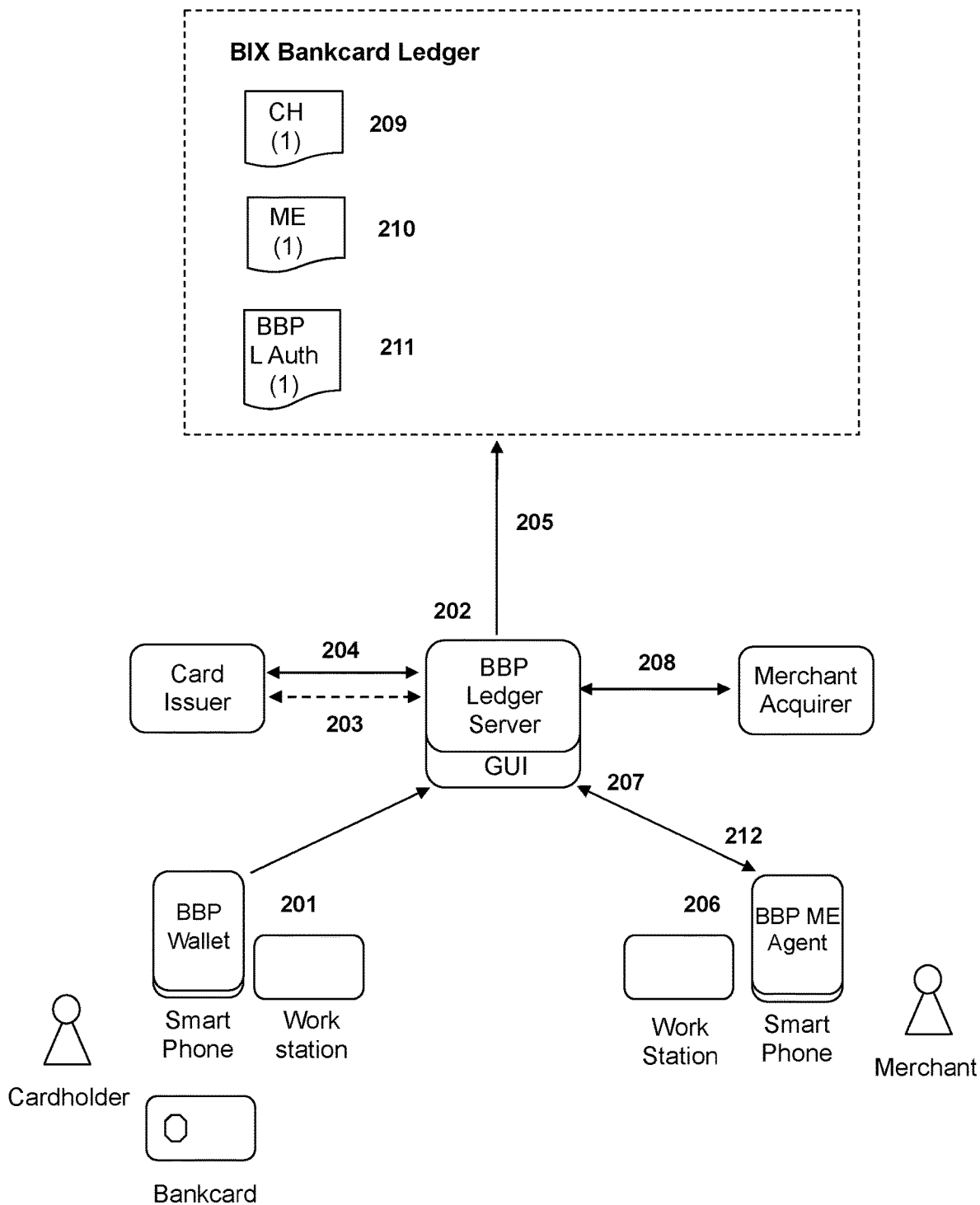
FIG 2: Components and Steps of the BIX Bankcard Payment System for Open Virtual Account Protocol by Cardholders and Merchants

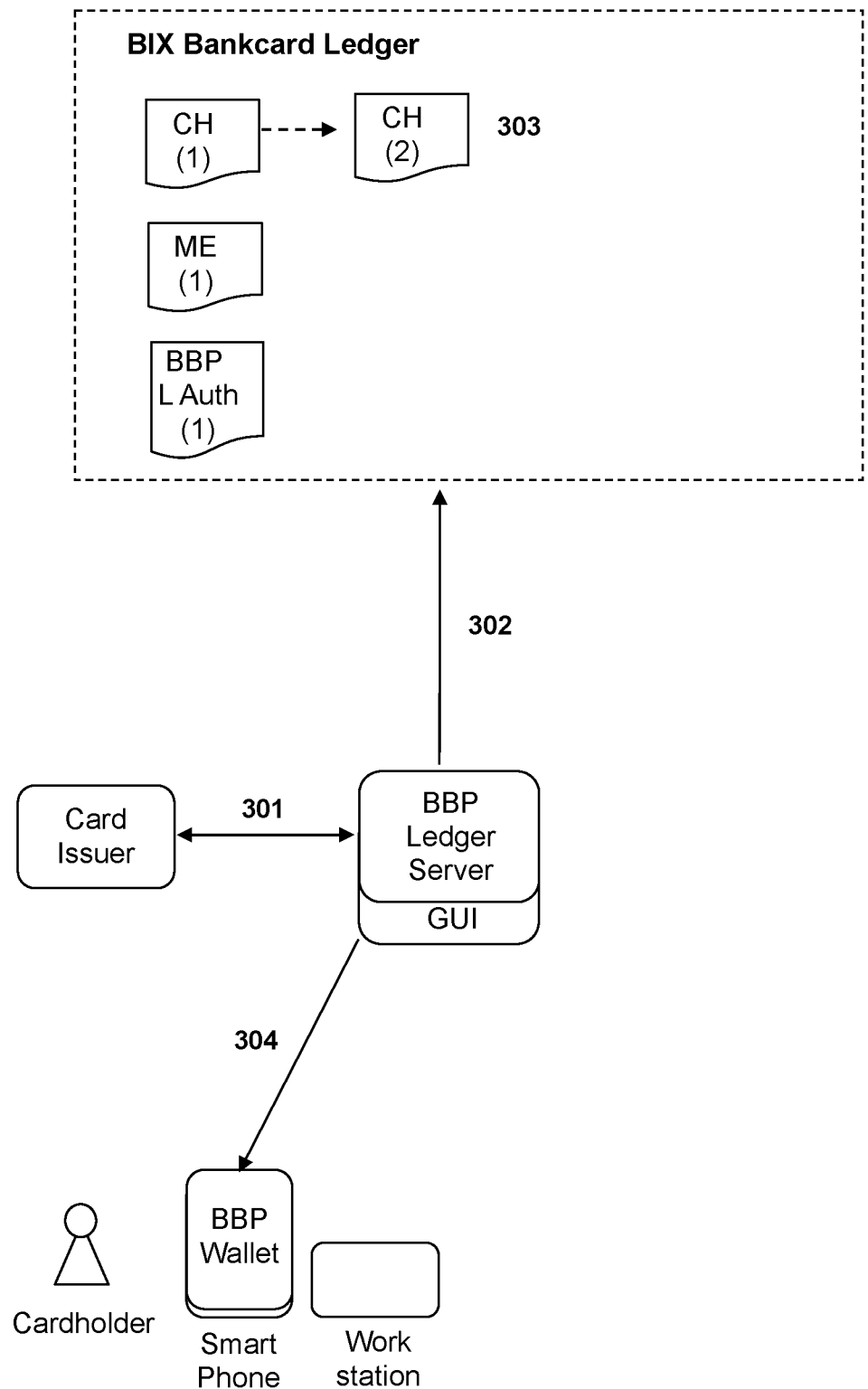
FIG 3: Components and Steps of the BIX Bankcard Payment System for Activate Virtual Account Protocol by Cardholders

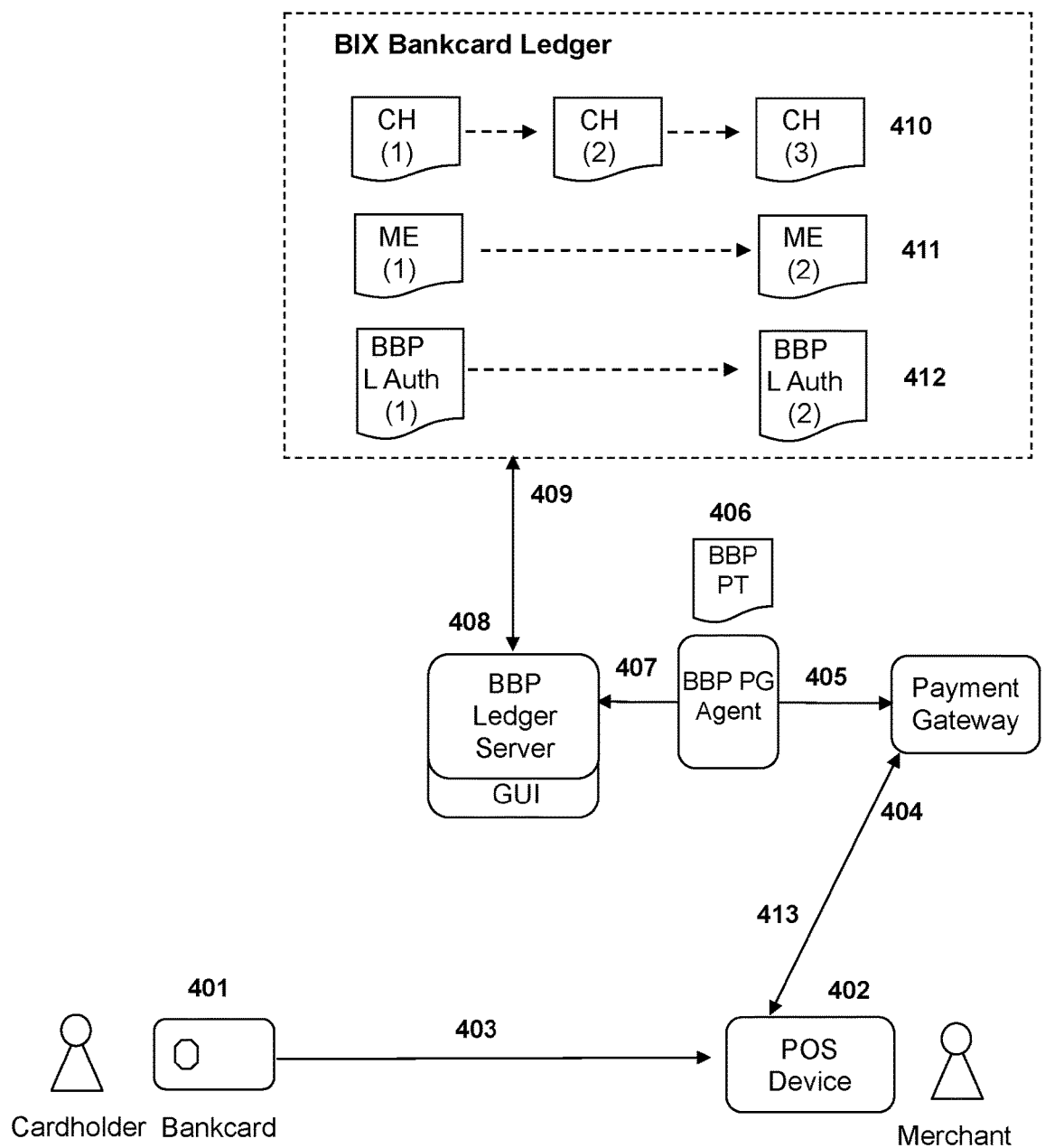
FIG 4: Components and Steps of the BIX Bankcard Payment System for Payment Protocol using Standard Bankcards and Merchant POS Devices

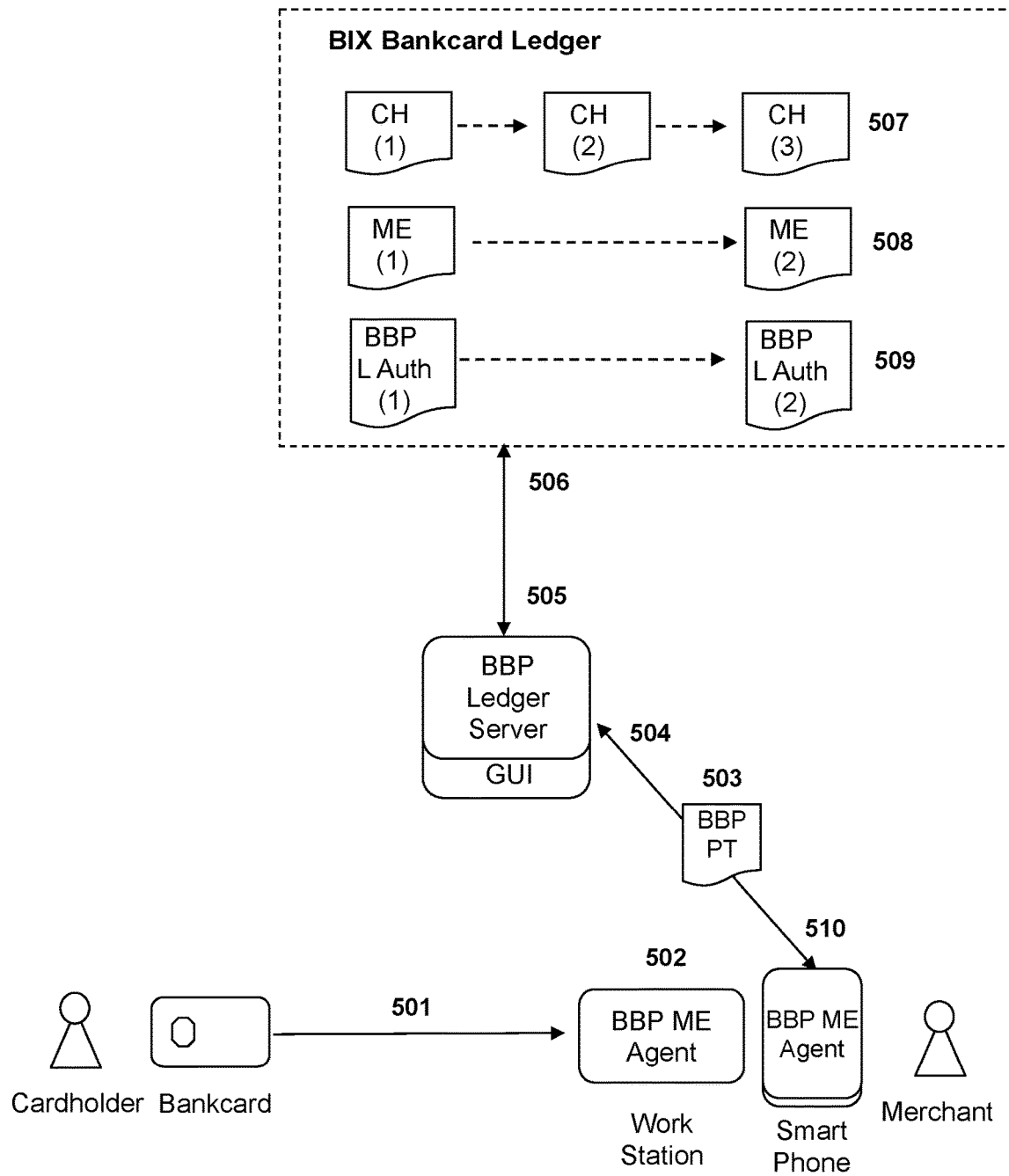
FIG 5: Components and Steps of the BIX Bankcard Payment System for Payment Protocol using Standard Bankcards and BIX Merchant Station

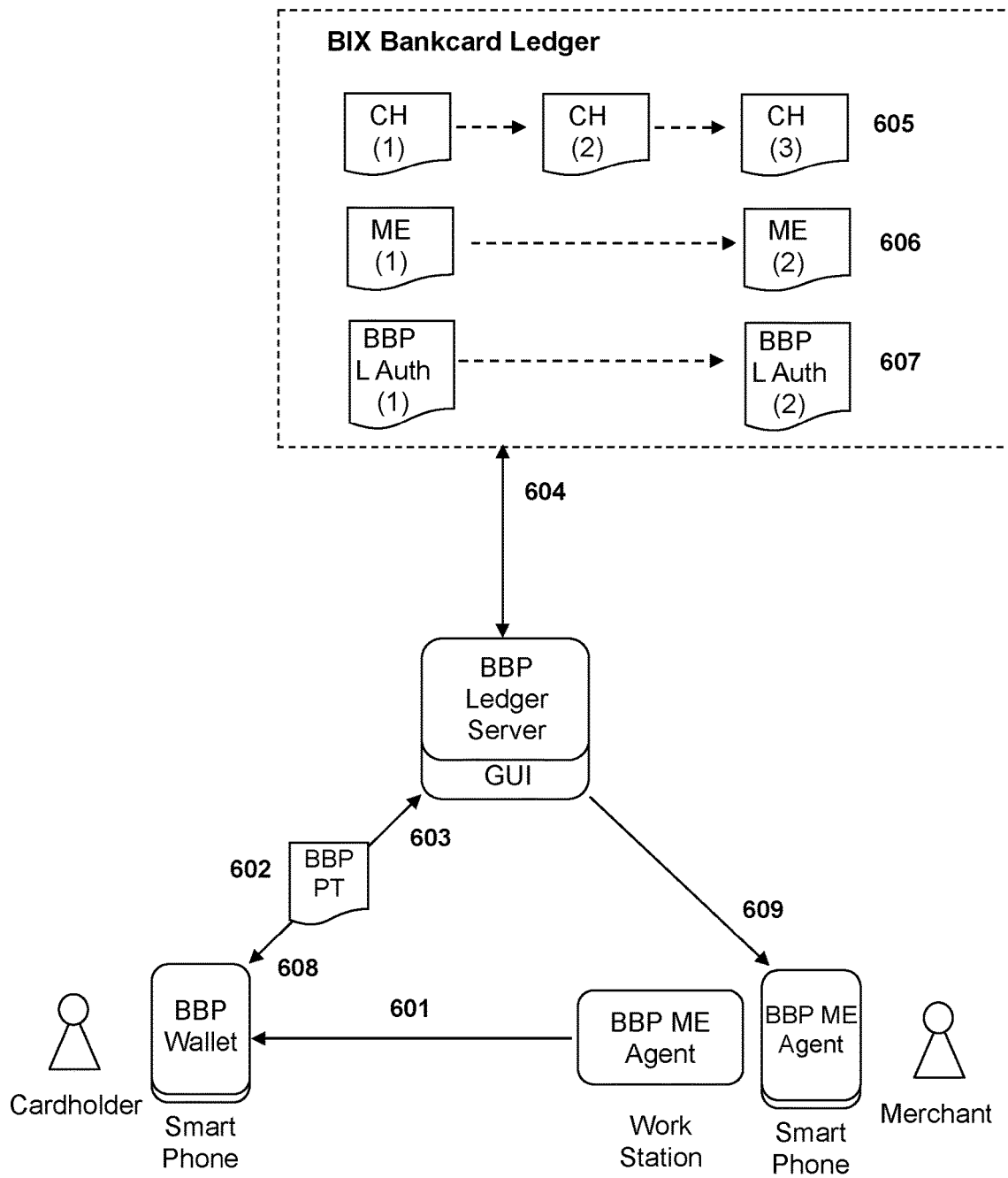
FIG 6: Components and Steps of the BIX Bankcard Payment System for Payment Protocol using BIX Cardholder Wallet and BIX Merchant Station

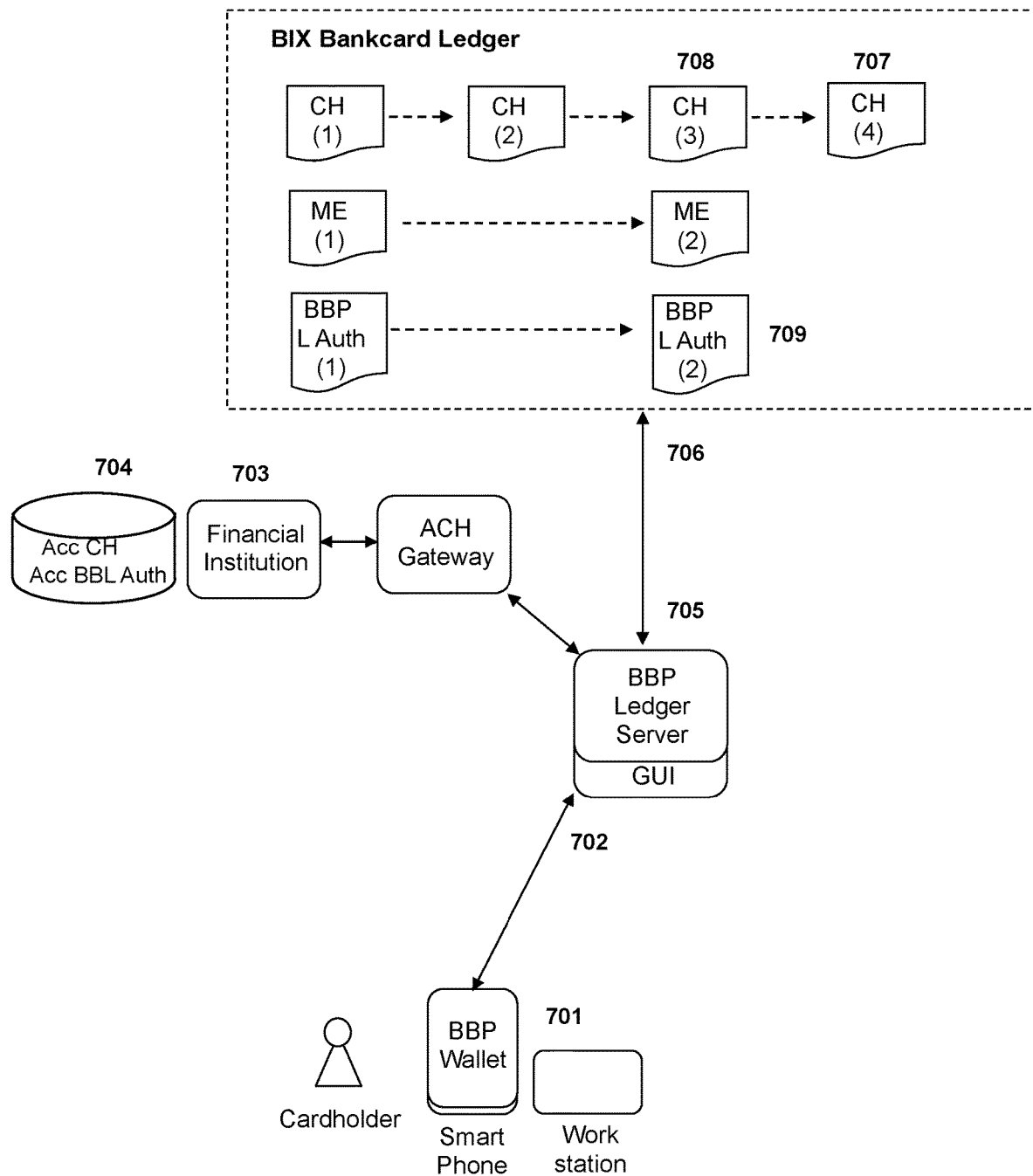
FIG 7: Components and Steps of the BIX Bankcard Payment System for Update Virtual Account Protocol by Cardholders

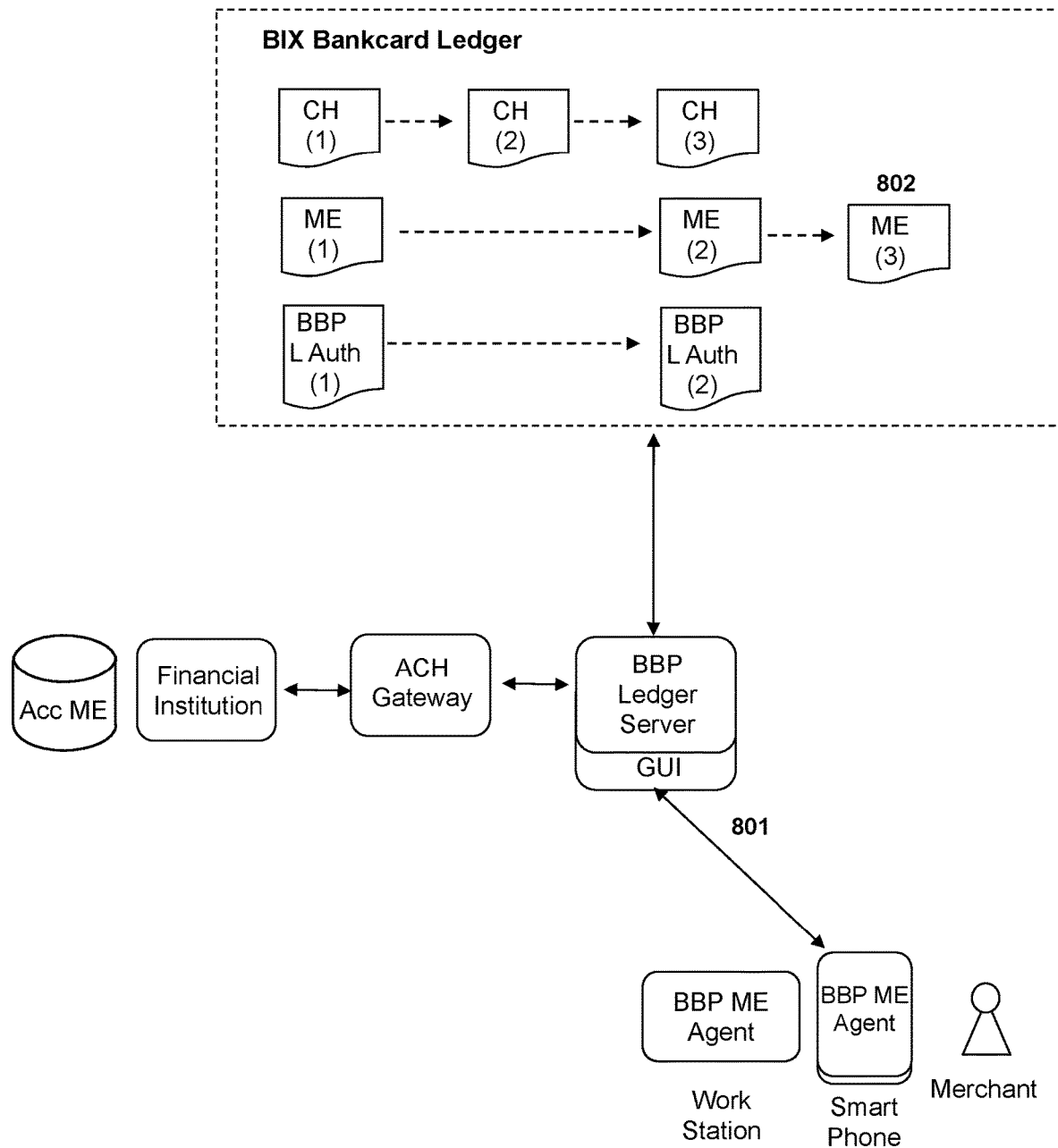
FIG 8: Components and Steps of the BIX Bankcard Payment System for Update Virtual Account Protocol by Merchants

```
BBP Cardholder Account ::= SEQUENCE {
    Header ::= SIGNED SEQUENCE {                    ←—— 901
        version             INTEGER
        instanceID          INTEGER                 ←—— 902
        previousInstanceHash OCTET STRING
        accountDateTime     CHOICE {
            UTCTime,
            generalizedTime
        }
    }
    BBLAuthHeaderSignature ::= BIT STRING           ←—— 903

BBPAuthorities ::= SIGNED SEQUENCE {            ←—— 904

Issuer ::= SEQUENCE {                       ←—— 905
            issuerBIXID         INTEGER
            signatureAlgorithm  AlgorithmIdentifier
            issuerPublicKey     OCTET STRING
        }
        BBLAuth ::= SEQUENCE {                      ←—— 906
            bblAgentBIXID       INTEGER
            signatureAlgorithm  AlgorithmIdentifier
            bblAuthPublicKey    OCTET STRING
        }
    }
    IssuerAuthoritiesSignature ::= BIT STRING       ←—— 907

AccountBankcardInfo ::= SIGNED SEQUENCE {       ←—— 908

AccountInfo ::= ENVELOPED SEQUENCE {        ←—— 909
            cardholderBIXID     INTEGER
            accountStatus       INTEGER
            accountNumber       INTEGER
            creditAccountLimit  REAL
            sourceCurrency      INTEGER
            fiRoutingNumber     OCTET STRING
            fiAccountNumber     OCTET STRING
        }
        BankcardInfo ::= ENVELOPED SEQUENCE {       ←—— 910
            cardholderName      OCTET STRING
            bankcardNumberHash  OCTET STRING
            cvvCode             INTEGER
            expirationMonth     INTEGER
            expirationYear      INTEGER
        }
    }
    IssuerAccountBankcardSignature ::= BIT STRING   ←—— 911

AccountBalance ::= SIGNED SEQUENCE {            ←—— 912
        lastTxNumber        INTEGER
        debitAccountBalance REAL
        creditAccountBalance REAL
    }
    BBLAuthAccountBalanceSignature ::= BIT STRING   ←—— 913
}
```

FIG 9: Permissioned Version of the Cardholder Virtual Account

```
BBP Cardholder Account ::= SEQUENCE {
    Header ::= SIGNED SEQUENCE {                        ← 1001
        version              INTEGER                    ← 1002
        instanceID           INTEGER
        previousInstanceHash OCTET STRING
        accountDateTime      CHOICE {
            UTCTime,
            generalizedTime
        }
    }
    BBLAuthHeaderSignature ::= BIT STRING               ← 1003

BBPAuthorities ::= SIGNED SEQUENCE {                ← 1004
        Issuer ::= SEQUENCE {                           ← 1005
            issuerBIXID       INTEGER
            signatureAlgorithm AlgorithmIdentifier
            issuerPublicKey   OCTET STRING
        }
        BBLAuth ::= SEQUENCE {                          ← 1006
            bblAgentBIXID     INTEGER
            signatureAlgorithm AlgorithmIdentifier
            bblAuthPublicKey  OCTET STRING
        }
    }
    BBLAuthAuthoritiesSignature ::= BIT STRING          ← 1007

AccountBankcardInfo ::= SIGNED SEQUENCE {           ← 1008
        AccountInfo ::= ENVELOPED SEQUENCE {            ← 1009
            cardholderBIXID   INTEGER
            accountStatus     INTEGER
            accountNumber     INTEGER
            creditAccountLimit REAL
            sourceCurrency    INTEGER
            fiRoutingNumber   OCTET STRING
            fiAccountNumber   OCTET STRING
        }
        BankcardInfo ::= ENVELOPED SEQUENCE {           ← 1010
            cardholderName    OCTET STRING
            bankcardNumberHash OCTET STRING
            cvvCode           INTEGER
            expirationMonth   INTEGER
            expirationYear    INTEGER
        }
    }
    BBLAuthAccountBankcardSignature ::= BIT STRING      ← 1011

AccountBalance ::= SIGNED SEQUENCE {                ← 1012
        lastTxNumber         INTEGER
        debitAccountBalance  REAL
        creditAccountBalance REAL
    }
    BBLAuthAccountBalanceSignature ::= BIT STRING       ← 1013
}
```

FIG 10: Unpermissioned Version of the Cardholder Virtual Account

```
BBP Merchant Account ::= SEQUENCE {

Header ::= SIGNED SEQUENCE {                ←—— 1101
        version             INTEGER
        instanceID          INTEGER             ←—— 1102
        previousInstanceHash OCTET STRING
        accountDateTime     CHOICE {
           UTCTime,
           generalizedTime
        }
    }
    BBLAuthHeaderSignature ::= BIT STRING       ←—— 1103

BBPAuthorities ::= SIGNED SEQUENCE {        ←—— 1104

Acquirer ::= SEQUENCE {                 ←—— 1105
            acquirerBIXID           INTEGER
            signatureAlgorithm      AlgorithmIdentifier
            acquirerPublicKey OCTET STRING
        }
        BBLAuth ::= SEQUENCE {                  ←—— 1106
            bblAgentBIXID           INTEGER
            signatureAlgorithm      AlgorithmIdentifier
            bblAuthPublicKey        OCTET STRING
        }
    }
    AcquirerAuthoritiesSignature ::= BIT STRING ←—— 1107

MerchantAccountInfo ::= SIGNED SEQUENCE {   ←—— 1108
        merchantBIXID       INTEGER
        accountStatus       INTEGER
        accountNumber       INTEGER
        lastTxNumber        INTEGER
        accountBalance      REAL
        sourceCurrency      INTEGER
        fiRoutingNumber     OCTET STRING
        fiAccountNumber     OCTET STRING
    }
    BBLAuthAccountInfoSignature ::= BIT STRING  ←—— 1109
}
```

FIG 11: Merchant Virtual Account

```
BBP Payment Transaction ::= SIGNED SEQUENCE {

BankcardInfo ::= ENVELOPED SEQUENCE {            ←—— 1201
        cardholderName          OCTET STRING
        bankcardNumberHash      OCTET STRING
        cvvCode                 INTEGER
        expirationMonth         INTEGER
        expirationYear          INTEGER
    }

MerchantAccountInfo ::= SEQUENCE {               ←—— 1202
        merchantBIXID           INTEGER
        merchantAccountNumber   INTEGER
    }

TxInitiator ::= SEQUENCE {                       ←—— 1203
        initiatorBIXID          INTEGER
        signatureAlgorithm      AlgorithmIdentifier
        initiatorPublicKey      OCTET STRING
    }

TxInfo ::= SEQUENCE {                            ←—— 1204
        txNumber                INTEGER
        txDateTime              CHOICE {
            UTCTime,
            generalizedTime
        }
        txType                  INTEGER
        txAmmount               REAL
        settlementDateTime      CHOICE {
            UTCTime,
            generalizedTime
        }
        settlementEvent         ObjectIdentifier
    }

InitiatorSignature ::= BIT STRING                ←—— 1205
}
```

FIG 12: Payment Transaction

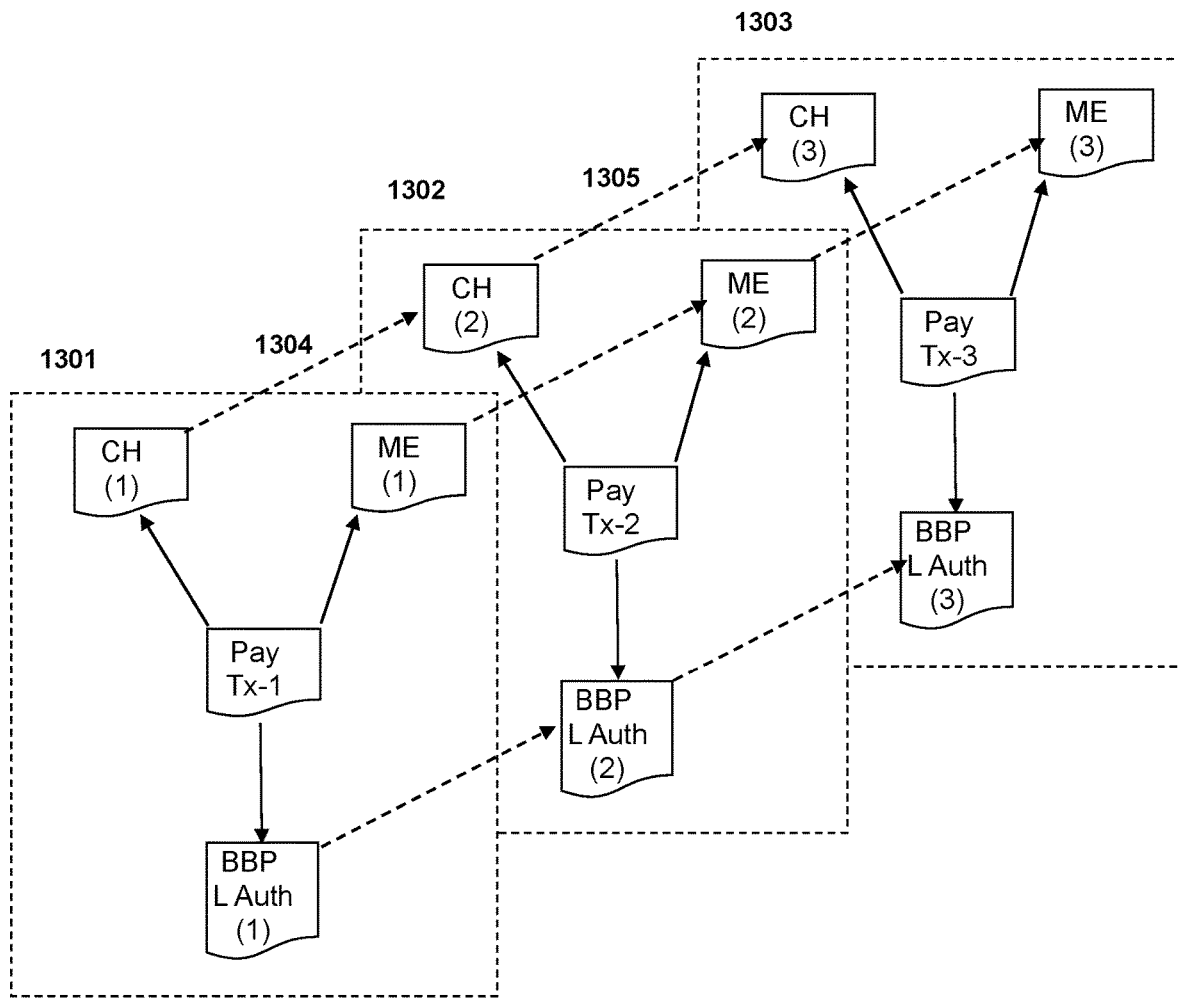
FIG 13: Triple-bonded Virtual Account Chains and Transaction "Slices" of the BIX Bankcard Payment Ledger

SECURE PAYMENT TRANSACTIONS BASED ON THE PUBLIC BANKCARD LEDGER

TECHNICAL FIELD OF THE INVENTION

This invention is related to the general category of payment systems based on use of bankcards. More specifically, it describes a system based on the innovative concept of a secure public bankcard ledger that supports peer-to-peer payment transactions with debit and credit cards without any third parties, with instantaneous validation, authorization, and settlement of transactions, and without any risks or vulnerabilities for system users.

BACKGROUND OF THE INVENTION

Bankcard payments are transactions performed between two parties, where one party, usually called the cardholder, makes the payment and the other party, usually called the merchant, receives the payment. Both parties use bank accounts supporting the payments. The cardholder's account is debited and the merchant's account is credited with the payment amount. Based on the timing of the payment transaction vs. its settlement, there are two types of bankcard payment transactions, debit or credit. With debit transactions the payment amount is immediately debited from the cardholder's account and credited to the merchant's account. With credit payments the transaction is instantaneously authorized, but the merchant's account is credited with a short delay. The cardholder's account accumulates credited payments, which are then paid by a cardholder at a later time.

In this type of payment, both parties have accounts that support payments. The merchant's account that receives the payment is always a standard bank account in a bank. That bank is called the acquiring bank, as it acquires payments on behalf of merchants. For debit payments, the account of the cardholder is also a standard bank account in a bank. That bank is called the issuing bank, as it issues bankcards to cardholders. Issuers may also be other financial institutions, not only banks. The cardholder's debit account must have a sufficient balance at the time of payment. For credit payments, the cardholder has an account with a line of credit with the financial institution that issued the card. The payment is made to the merchant by that institution, and the amount is accumulated in the cardholder's credit account and paid at a later time.

The main goal of each bankcard payment transaction is to authorize payment to the merchant from the cardholder's account. With a debit payment, the authorization is performed as an immediate transfer of funds to the merchant's account. With a credit payment, the merchant first receives an authorization from the cardholder's financial institution, which pays the transactions and credits the cardholder's credit account. To get payment authorization, the cardholder must give his/her consent. For that purpose the cardholder has a bankcard account number. Presentation of that number and its verification by the financial institution constitutes payment consent.

Bankcard account numbers are distributed to cardholders in the form of the plastic bankcards with the number written on the face of the card and also recorded either in the chip or in the magnetic stripe of the card. To give consent for payment, the standard protocol used at the time of this invention is for the cardholder to give his/her bankcard account number to the merchant, who presents it to the cardholder's bankcard financial institution—card issuer, as an authorization request. The issuing institution returns a response to the merchant, which is an authorization response—approval or rejection of the payment.

The infrastructure to perform bankcard payment transactions is very complex and has many components. It is shown in FIG. 1. At the counter, merchants use various types of point-of-sale (POS) devices used to capture the cardholder's bankcard number. At larger stores, those devices are usually connected to the store's payment server, which is connected to the payment gateway that accumulates payment transactions from local merchants. Payment gateways are connected to larger payment switches called payment processors. To interconnect to multiple banks, payment processors are connected to the bankcard brand network and that network connects payment-processing components to the issuer and acquirer banks.

At the time of this invention, bankcard payment technologies, payment protocols, and payment infrastructures have many problems, resulting in high fees, fraud, and serious financial damages. The first group of problems is due to the complexity of the system. Because the system has many components, its structure and protocols are complex, expensive to maintain, and vulnerable. The other group of problems is based on the very bad practice of requiring cardholders to give consent by sharing their bankcard account number, which should remain secret between the cardholder and his/her issuer financial institution. Due to a complex and insecure protocol, that bankcard account number is recorded and known to many parties in the system. In essence, most of the problems with the bankcard payment systems that exist at the time of this invention are caused by two main reasons: (a) complex payment infrastructure with multiple components and (2) weak authentication and authorization mechanisms.

Another group of problems in standard bankcard processing systems is user privacy and anonymity. In fact, user privacy and anonymity does not exist at all, as all cardholder transactions are available to all parties of the system involved in processing of transactions. All cardholder purchases are traceable as the same bankcard number is used for each of them. This results in the tracing and profiling of cardholders by unauthorized parties (store and Web merchants), thus violating their privacy and anonymity.

At the time of this invention, there is an emerging and disruptive technology with technical, conceptual, and organizational characteristics that seems as a promising concept that could solve all the problems of the standard bankcard payments infrastructure. That technology and concept were introduced by Bitcoin, the anonymous peer-to-peer electronic cash system. In the Bitcoin system that concept is called the blockchain and, in essence, it represents a public ledger of all transactions. The core of the account validation process when performing payments is that the account has to have a sufficient balance to make a payment. Because Bitcoin is a peer-to-peer payment system without third parties, it does not use the complex infrastructure of multiple third parties to validate its payment transactions. In Bitcoin, to validate whether an account has a sufficient balance, all of that account's transactions are made publicly available. In that way, the recipient of the transaction can validate that the payer is in possession of a sufficient amount of the currency and is not making double payments. The requirements for the ledger are that the transactions cannot be illegally modified, inserted, or deleted after their settlement. This is achieved using a public ledger that is a globally available, distributed, replicated, synchronized, append-only, and secure archive of transactions.

In this invention, the idea of a public ledger is used as the solution for both of the core problems in bankcard payment system. Public ledgers support validation of peer-to-peer transactions without the participation or assistance of any third party, so the use of these ledgers eliminates all components of complex bankcard payment infrastructures. Accounts that use Bitcoin are anonymous and unforgeable, which is an ideal approach for hiding and protecting bankcard account numbers when used to authorize transactions.

In other words, this invention describes a system that supports direct, peer-to-peer payment transactions between cardholders and merchants that (a) does not require validation by a third party, (b) does not require trust in any party in the system, (c) uses a cryptographic (and therefore strongly protected) form of bankcard numbers, and (d) provides security, privacy, anonymity, and untraceability for users, their accounts, and their transactions. With these features, the proposed system eliminates all components of complex bankcard payment infrastructures and, therefore, all weaknesses and disadvantages of these infrastructures, such as complexity, inefficiency, high fees, and vulnerabilities. The proposed system also prevents intrusions and eliminates the threat of stolen bankcard numbers and funds, as well as the personal damages associated with those threats. Finally, the proposed system eliminates the possibility that users and their transactions can be traced, tracked, and profiled.

The secure bankcard payment system described in this invention is one type of a larger and more general system that supports the peer-to-peer exchange of any type of secure, private, and anonymous data or transaction over the open Internet using a public transactions ledger. A public transactions ledger is a public archive of all objects reflecting the actions that have been performed in the system. Its main purpose is to provide data, cryptographic mechanisms, and protocols to validate transactions without the assistance of third parties. The objects, individually or grouped in blocks, are cryptographically encapsulated and mutually linked in a functional or time sequence. The concept of a public transactions ledger is known as a blockchain. The system described in this invention, called the Blockchain Information eXchange (BIX), is a conceptually broad system that supports the validation of any type of secure, private, and anonymous peer-to-peer transaction using a public transactions ledger (blockchain).

SUMMARY OF THE INVENTION

The bankcard payment system described in this invention performs payments as peer-to-peer transactions, without the assistance of any third party for validation and authorization of payment transactions. In one embodiment, the system uses standard EMV debit and credit bankcards and merchants use standard POS devices. In such embodiment of the system, no modifications are needed at the front-end (by cardholders and merchants). In another embodiment cardholders use standard plastic chip or magnetic stripe bankcards, but merchants use special mobile software modules as their point-of-sale devices. In yet another embodiment standard plastic bankcards are not used and both cardholders and merchants use specially designed mobile software modules and an innovative payment protocol with increased efficiency and improved security, privacy, and untraceability.

For validation and authorization of payment transactions, the system uses a global, distributed, append-only, and secure public bankcard ledger. The entries in the ledger are virtual accounts used for bankcard payments, organized in account chains. Both cardholders and merchants have bankcard payment accounts in the ledger; these accounts are cryptographically encapsulated objects, so their content is protected against forgery, fraud, and impersonation. The ledger is managed and controlled by the members of the system with special roles and authorities, called bankcard BIX Bankcard Payments (BBP) Ledger Authorities. They use software components called BBP Ledger Servers to maintain the Ledger. Multiple instances of these Servers and multiple, replicated copies of the BBP Ledger constitute the infrastructure for validating and archiving payment transactions.

The BBP Ledger and its objects designed in this invention are also innovative compared with the ideas that are broadly accepted at the time of this invention. Namely, the standard approach to ledgers is that they are either permissioned or unpermissioned. In this invention, the property of being permissioned or unpermissioned is not applied to the entire ledger, but to individual objects in the ledger—virtual accounts. The accounts are either permissioned or unpermissioned, and both types are included in the same ledger. Virtual accounts representing debit cards are unpermissioned, while virtual accounts representing credit cards are permissioned. Thus, it may be said that the innovative bankcard ledger described in this invention is a mixed ledger.

After their creation, permissioned virtual accounts are validated and then digitally signed by the financial institutions that support cardholders and merchants. This means that cardholders' virtual accounts are validated and digitally signed by issuers, while merchants' virtual accounts are validated and then digitally signed by acquirers. Both types of virtual accounts are then also validated and digitally signed by the corresponding BBP Ledger Servers. Unpermissioned accounts are not validated by issuers, they are only validated and digitally signed by BBP Ledger Servers.

Another important feature of the system is that it uses virtual currency for payment transactions. The virtual currency, called the BIXCoin, represents a unit of value. It is stable, as it is pegged to real-world currencies, and its unit value is equivalent to the national currency of the country of deployment. The virtual currency owned by each transaction party—cardholders and merchants—is stored in specially designed virtual accounts suitable for bankcard payments and stored in the public bankcard ledger.

The prerequisites to join and participate in the system are the same as for participation in the standard bankcard payment system. Cardholders should have been issued a standard plastic bankcard. If the bankcard is a credit card, they should have an account with a credit limit determined by the bankcard issuer. They should also have a standard account in a financial institution that is used for debit payments with debit cards and to pay the accumulated credit on credit cards. Merchants should have a standard account in a financial institution used to receive payments.

To join the system and perform bankcard payments, cardholders and merchants must first open their bankcard payment virtual accounts. These virtual accounts are created as data objects and inserted in the BBP Ledger as the first objects in cardholders' and merchants' bankcard chains. If cardholder accounts are permissioned, they are first validated and digitally signed by the issuer of the cardholder's bankcard. If cardholder accounts are unpermissioned, then they are validated and digitally signed only by BBP Ledger Servers. As mentioned before, virtual accounts representing credit cards are always permissioned and virtual accounts representing debit cards are always unpermissioned. Merchants' accounts are always permissioned, so they are first validated and digitally signed by the acquirer where the merchant has a regular, real-world account. Next, the virtual accounts validated and digitally signed by issuers or acquirers are also validated, digitally signed, and inserted into the BBP Ledger by the BBP Ledger Server operated by the BBP Ledger Authority with which the cardholder or merchant is associated. In this process, a service fee is paid to the BBP Ledger Authority and successful completion of that payment transaction using standard bankcard accounts (with the bankcard issuer) represents validation of the cardholder's virtual account by the Server.

After opening virtual accounts and their validation, merchants are ready to start accepting payment transactions.

Cardholders must perform one additional step—activation of the bankcard payment virtual account. The procedure in this step is different for virtual accounts that represent debit cards vs. virtual accounts that represent credit cards. For virtual accounts that represent credit cards, the credit limit must be established and set in the virtual account. The value of that limit is determined by the bankcard issuer. Therefore, it is applicable only to permissioned accounts and populated by the bankcard issuer during the Activate Virtual Account protocol for the newly created virtual account. For virtual accounts representing debit cards, a certain amount of virtual currency—BIXCoins—must be loaded into the virtual account that will be used for debit payments. This protocol is performed by the cardholder with assistance from the BBP Ledger Server. This protocol represents in fact the purchase of BIXCoins. After the credit limit is determined and approved by the bankcard issuer (for virtual accounts representing credit cards), or a certain number of BIXCoins is purchased and loaded onto the debit card virtual account, cardholders are ready to perform payment transactions.

A payment transaction is initiated after an initial exchange between the cardholder and merchant is completed in which the two parties agree on all aspects of the transaction. The system designed in this invention has three embodiments and payment transactions are performed differently in each of these three embodiments.

In the first embodiment of the system, the cardholder uses a standard plastic bankcard and the merchant uses a standard POS device. In this embodiment there are no modifications at the front-end and an interface to the BBP Ledger is created at the back-end as the extension of the payment gateway. This component of the standard bankcard payment system (shown in FIG. 1), in addition to the connection to the payment processor, also connects to the BBP Ledger Server using a local BBP Payment Gateway Agent (BBP PG Agent) (FIG. 4). A payment transaction at the front-end is performed in the standard way: the cardholder presents the bankcard to the merchant, the merchant swipes/inserts it into the POS device, the device captures the bankcard data, creates an authorization request transaction, and forwards it to the payment gateway. The payment gateway then passes the standard payment transaction data to the BBP PG Agent, which converts it into the special object, called the BIX Payment Transaction, and sends it to the BBP Ledger Server. The BBP Ledger Server (a) retrieves two BBP Virtual Accounts (the cardholder and merchant's account), (b) modifies them appropriately to reflect the payment transaction, (c) digitally signs them, and (d) writes them back into the BBP Ledger. In that process, the BBP Ledger Authority that operates BBP Ledger Server charges a service fee, which is also reflected in the updated balance of the two accounts, and updates the account object that belongs to the BBP Ledger Authority in the BBP Ledger. This embodiment eliminates many background components of the standard payment infrastructure shown in FIG. 1. However, the disadvantage of this embodiment is that the cardholder still passes his/her bankcard number to the merchant and payment gateway must be modified.

In the second embodiment of the system, the cardholder still uses a standard plastic bankcard, but the merchant uses a special application called the BBP Merchant Agent (BBP ME Agent), which is an application for a smart phone or a station/tablet. Both devices require as add-on hardware a reader with which to read bankcards. The reader may be capable of processing magnetic stripe cards, chip cards, or both. In this embodiment the cardholder presents his/her bankcard data in the same way as in the previous embodiment, except the BBP ME Agent application itself creates the BBP Payment Transaction object and forwards it directly to the BBP Ledger Server, bypassing the payment gateway. Therefore, this embodiment eliminates another component of the standard payment infrastructure, the payment gateway. However, this embodiment still does not solve the problems associated with sharing the cardholder's bankcard number, the tracking and profiling of cardholders, and user privacy and anonymity. But, at least, it does not need extension of the payment gateway.

In the third embodiment of the system, the cardholder also uses a special application, called the BBP Wallet, which is an application for smart phones or a station/tablet. With this embodiment instead of the cardholder passing his/her bankcard number to the merchant, the merchant passes transaction data to the cardholder. This transfer may be over-the-counter, if two parties are in the vicinity of each other, or over-the-air, if they are remote. After receiving the transaction data the cardholder's BBP Wallet creates BIX Payment Transaction object and passes it to the BBP Ledger Server. The BBP Ledger Server then performs the same procedure, updates the BBP Ledger, and returns (a) an authorization message to the BBP ME Agent and (b) payment confirmation to the cardholder. This embodiment is as efficient as the previous embodiment, but also eliminates problems with cardholder security, privacy, and anonymity.

If payment is made using a virtual account representing debit card, then the payment amount is immediately transferred from the cardholder's virtual account to the merchant's virtual account. The debit balance in the cardholder's virtual account is reduced by the payment amount. If the payment is based on a virtual account representing credit card, then the credit balance in the cardholder's virtual account is incremented.

When the debit balance is exhausted or the credit balances reaches its limit, the cardholder must settle the balance of the account. If the virtual account is a debit account, then the cardholder must re-purchase an additional number of BIXCoins to make further payments. If the virtual account is a credit account, the cardholder must pay the credit to the issuer, after which the credit balance is reduced by the paid amount. Both actions are performed with the assistance of the BBP Ledger Server, and as a result of both actions a new instance of the cardholder's virtual account is created and added to the BBP Ledger.

Merchants may use BIXCoins to pay to other members of the BBP system. But, if they need real-world currency, they can may destroy (cash out) a certain amount of the virtual currency. That action can be performed by sending request to the BBP Ledger Server, which creates an updated instance of the merchant's account and adds it to the BBP Ledger.

DESCRIPTION OF THE DRAWINGS

FIG. 1: Components and Protocols of the Standard Bankcard Payment System

FIG. 2: Components and Steps of the BIX Bankcard Payment System for Open Virtual Account Protocol by Cardholders and Merchants FIG. 3: Components and Steps of the BIX Bankcard Payment System for Activate Virtual Account Protocol by Cardholders FIG. 4: Components and Steps of the BIX Bankcard Payment System for Payment Protocol using Standard Bankcards and Merchant POS Devices FIG. 5: Components and Steps of the BIX Bankcard Payment System for Payment Protocol using Standard Bankcards and BIX Merchant Station FIG. 6: Components and Steps of the BIX Bankcard Payment System for Payment Protocol using BIX Cardholder Wallet and BIX Merchant Station FIG. 7: Components and Steps of the BIX Bankcard Payment System for Update Virtual Account Protocol by Cardholders FIG. 8: Components and Steps of the BIX Bankcard Payment System for Update Virtual Account Protocol by Merchants FIG. 9: Permissioned Version of the Cardholder Virtual Account FIG. 10: Unpermissioned Version of the Cardholder Virtual Account FIG. 11: Merchant Virtual Account FIG. 12: Payment Transaction FIG. 13: Triple-bonded Virtual Account Chains and Transaction "Slices" of the BIX Bankcard Payment Ledger

DETAILED DESCRIPTION OF THE INVENTION

1. The Architecture and Components of the BIX Bankcard Payment (BBP) System

The BBP system comprises two types of components—active components and data components.

The active components are:

The BIX Bankcard Payment Wallet (BBP Wallet): this component is a mobile or workstation application used by cardholders to perform payments and other transactions. It has a graphical interface for users, business logic, a communication module, local database drivers, and cryptographic engines. If the cardholder does not have a device with processing capabilities, this application is implemented as a Web application and the cardholder uses a standard browser to access it.

The BIX Bankcard Payment Merchant Agent (BBP ME Agent): this component is a software mobile or workstation application used by merchants to perform payments and other transactions. It has a graphical interface for users, business logic, a communication module, local database drivers, and cryptographic engines. If the merchant does not have a device with processing capabilities (other than a POS device), this application is implemented as a Web application and the merchant uses standard browser to access it.

The BIX Bankcard Payment Gateway Agent (BBP PG Agent): this component is software server used by payment gateways to perform payments and other transactions. It has a graphical interface for administrators, business logic, a communication module, local database drivers, and cryptographic engines. It represents the link between standard payment gateway server and BBP Ledger Server.

The BIX Bankcard Payment Ledger Server (BBP Ledger Server): this component is a software server used by members of the system with special roles to access and maintain bankcard payments ledger, in order to validate virtual accounts and payment transactions of cardholders and merchants and to assist them with payment transactions. The Server is also linked to data processing system of financial institutions supporting bankcard payments—card issuers and acquirers.

The data components are:

The BIX Bankcard Payment (BBP) Cardholder Virtual Account: this is cryptographically encapsulated and digitally signed data object containing attributes and segments representing cardholders' virtual accounts. The segments of attributes are the header of a virtual account, the identity of the issuer of the bankcard, the identity of the BBP Ledger Server with whom the merchant is associated, account information, and account balance. The structure of this data object is equivalent in its permissioned and unpermissioned form, but its cryptographic encapsulations are different. The permissioned version is shown in FIG. 9, and the unpermissioned version is shown in FIG. 10.

The BIX Bankcard Payment (BBP) Merchant Virtual Account: this is a cryptographically encapsulated and digitally signed data object containing attributes and segments representing merchants' virtual accounts. The segments of attributes are the header, the identity of the acquirer, the identity of the BBP Ledger Server with whom the merchant is associated, and account information. The structure of this data object is shown in FIG. 11.

The BIX Bankcard Payment (BBP) Payment Transaction: this is cryptographically encapsulated and digitally signed data object containing attributes organized in four segments representing payment transaction. The segments are the information about the virtual account of the cardholder making the payment, the information of about merchant virtual account receiving the payment, the identity of the BBP System component that initiated the transaction, and the financial information about the transaction itself. This data object is shown in FIG. 12.

The BIX Bankcard Payments Ledger (BBP Ledger): this is a collection of forward-linked lists of BBP Accounts. The lists are organized as a chain of instances of virtual accounts for the three types of active components in the system: cardholders, merchants, and BBP Ledger Authorities. Each individual entity in one instance of the BBP system has its own chain.

The BBP Wallet, BBP ME Agent, and BBP PG Agent are configured to access the specific instance of the BBP Ledger Server. These three components may be configured to access different Servers, as there are multiple Servers in the BBP network. In that case, the BBP Ledger Server that assists with the specific payment transaction is the one with whom the Server of the transaction-initiating entity is associated. Each BBP Ledger Server has as its local copy the entire BBP Ledger of virtual accounts and payment transactions. The Ledger is a global, distributed, replicated, and fully synchronized archive of instances of virtual accounts and payment transactions. The global state of the BBP Ledger represents the collection of multiple, replicated and identical copies and each BBP Ledger Server has the same "view" of the Ledger. All instances of the four active components and all instances of the BBP Ledger constitute the global BIX bankcard payment infrastructure.

Each BBP Ledger Server has online connections with real-world financial institutions in order to perform transactions with these institutions. These connections are used to validate cardholders and merchants' virtual accounts and to update virtual accounts.

2. The BIX Bankcard Payment (BBP) Protocols

The main prerequisite for these protocols is that the cardholder has received a standard, plastic bankcard. If the bankcard is a credit card, the cardholder has a credit account associated with the bankcard operated by the financial institution that issued the card. If the bankcard is a debit card, the cardholder has a savings or checking account in a bank. The prerequisite for the merchant is that it has opened a merchant payments account with a financial institution acting as acquirer. Further prerequisites are that the issuers of debit cards, the acquirers for merchant accounts, and the BBP Ledger Authorities are already registered in the BIX Identities System and their certificates have been issued by the BIX Certificates System.

2.1 The Open Virtual Account Protocol

The purpose of the Open Virtual Account Protocol is for cardholders and merchants to open their new virtual accounts. For that, they use the BBP Wallet application (cardholders) or the BBP ME Agent application (merchants).

A. Opening a BBP Cardholder Virtual Account: the cardholder provides data from his/her bankcard and also data about his/her financial institution where the cardholder has an account using BBP Wallet 201. In case of opening a virtual account representing debit card, that data represents the financial institution where the cardholder has a real-world account used for debit payments. When opening a virtual account representing credit card, the data indicates the financial institution which is the issuer of the card. The cardholder submits the data to the BBP Ledger Server with whom the cardholder is associated 202.

Registration data are also stored locally with the BBP Wallet in an encrypted form. The encryption is enveloped with the cardholder's own public key so that only the cardholder's private key can "open" the envelope and use the data. An innovative solution for generating the private key is described in section 3.3, where the private key does not exist in the system when it Is not in use.

To create a request to open a BBP Cardholder Account, the cardholder uses the BBP Wallet. Through its graphical interface, he/she enters the data required to open the account. The BBP Wallet creates an instance of the BBP Cardholder Account with the value of the instanceID attribute 902 in the Header 901 set to zero (0). This is the only attribute populated in the Header segment. Both segments, AccountInfo 909 and BankcardInfo 910 in the AccountBankcardInfo segment 908 are populated with data provided by the cardholder. These two segments are enveloped using the public key of the BBP Ledger Server, and the entire AccountBankcardInfo segment is signed by the cardholder 911. This version of the BBP Cardholder Account object is then sent to the BBP Ledger Server 202.

Upon receiving the object, the BBP Ledger Server recognizes that it is a request to open the virtual account based on the value of the instanceID attribute. To open a virtual account, the BBP Ledger Server populates the Header segment 901 as follows: the version attribute is set to 11 (one-one), indicating a permissioned account with an status "opened" or to 22 (two-two), indicating an unpermissioned account with an status "activated". The instanceID attribute 902 is set to one (1), previousInstanceHash is not populated, and accountDateTime is set to the current date and time. This Header segment is then digitally signed by the BBP Ledger Server 903.

The BBPAuthorities segment 904 is populated as follows: based on the routing number and account number for an unpermissioned account, the BBP Ledger Server fetches the BIX Identity object of the financial institution that issued the bankcard from the BIX Identities Ledger and gets the parameters to populate the Issuer segment. For permissioned accounts, the Issuer segment is not populated in this protocol but is populated by the bankcard issuer in the Activate Account Protocol. The BBP Ledger Server already knows the values of the attributes in the BBLAuth segment 906. If the account is unpermissioned, the BBP Ledger Server signs the BBPAuthorities segment 907.

The AccountBankcardInfo segment 908 is populated as follows: first, AccountInfo segment 909 is populated. If the cardholder is already registered in the BIX Identities system, then his/her BIX Identity is fetched from that ledger and cardholderBIXID is populated from the cardholder's BIX Identity object. If the cardholder is not registered, the BBP Ledger Server generates the value of the cardholderBIXID attribute as a random number. accountStatus is set to "opened," and accountNumber is generated as a random number. If the virtual account represents a debit card, creditAccountLimit is not populated. Otherwise, it is populated later by the bankcard issuer. The sourceCurrency, fiRoutingNumber, and fiAccountNumber attributes are populated using the values provided by the cardholder for debit card accounts. For credit card accounts, only the sourceCurrency attribute is populated based on the default value of the country in which the system is deployed. The BankcardInfo segment 910 is populated with values provided by the cardholder. The BBP Wallet then creates a hash of the bankcard number so that the number is not known even to the BBP Ledger Server.

After completing the AccountInfo 909 and BankcardInfo 910 segments, the BBP Ledger Server envelopes them with the appropriate public key, with the exception of the cardholderBIXID attribute. If the account is unpermissioned, the complete AccountBankcardInfo segment is enveloped using the public key of the BBP Ledger Server, specified in the bblAuthPublicKey attribute. If the account is unpermissioned, the BBP Ledger Server uses the public key of the bankcard issuer, specified in the issuerPublicKey attribute, to envelope the AccountBankcardInfo segment. After that, the BBP Ledger Server digitally signs the AccountBankcardInfo 911 segment.

The AccountBalance 912 segment is not populated in this protocol.

If the virtual account is unpermissioned, then the BBP Ledger Server contacts the bankcard issuer online 103 and charges a registration fee to the bankcard specified by the cardholder. Authorization of that payment by the bankcard issuer represents confirmation of the bankcard and the real-world account with which it is associated. After receiving payment authorization, the BBP Ledger Server sets the accountStatus attribute in the AccountInfo 909 segment to "activated." This account is then written 205 into the BBP Ledger 209 and is ready to be used for the Payment Protocol.

If the account is permissioned, the BBP Ledger Server sends it to the issuer for activation 204.

In summary, if the virtual account represents a debit card, it is therefore unpermissioned and (a) all segments are created and digitally signed by the BBP Ledger Server, (b) two segments of the AccountBankcardInfo 908 segment are enveloped using the BBP Ledger Server's public key, (c) the Header, BBPAuthorities, and AccountBankcardInfo segments are digitally signed by the BBP Ledger Server, (d) the AccountBalance 912 segment and the BBLAuthAccountBalanceSignature 913 attribute are not populated, and (e) the account's financial data are verified by the BBP Ledger Server by charging a service fee.

B. Opening a BBP Merchant Virtual Account: the merchant provides data for the merchant's virtual account using the graphical interface of the BBP ME Agent 206. In the same way as creating a BBP Cardholder Account that represents request to open a virtual account, instanceID 1102 is set to zero (0). Selected attributes of the MerchantAccountInfo 1108 segment are populated, the segment is enveloped using the public key of the BBP Ledger Server and the segment is digitally signed by the merchant 1109. This object is then sent to the BBP Ledger Server 107.

The BBP Ledger Server first verifies the digital signature and if it is OK, "opens" the digital envelope and populates the Header 1101 segment in the same way as for a cardholder's virtual account. The version attribute is always set to 11 (one-one), indicating a permissioned account with the status "opened". The Header segment is signed by the BBP Ledger Server 1103.

The Acquirer segment 1105 is populated following the procedure equivalent to how the Issuer segment is populated for a cardholder's virtual account. The BBLAuth segment 1106 is populated with data designating the BBP Ledger Server.

The MerchantAccountInfo segment 1108 is populated as follows: if the merchant is already registered in the BIX Identities system, then his/her BIX Identity is fetched from that ledger and merchantBIXID is populated from the merchant's BIX Identity object. If the merchant is not registered, the BBP Ledger Server generates the value of the merchantBIXID attribute as a random number. accountStatus is then set to "opened" and accountNumber as generated as a random number. lastTxNumber is not populated, accountBalance is set to zero (0), and the sourceCurrency, fiRoutingNumber, and fiAccountNumber attributes are populated using the values provided by the merchant.

The BBP Ledger Server envelopes the MerchantAccountInfo segment 1108 with the public key of the acquirer, with the exception of the merchantBIXID attribute, digitally signs MerchantAccountInfo segment 1109 and sends it to the acquirer for activation 208.

2.2 The Activate Virtual Account Protocol

The purpose of the Activate Virtual Account Protocol is to activate newly opened accounts. The protocol is different for cardholders and for merchants.

A. The Activation of a Cardholder Virtual Account: for cardholders, only permissioned accounts (credit card accounts) are activated by the bankcard issuer. After receiving the BBP Cardholder Account object from the BBP Ledger Server 301, the bankcard issuer first verifies the object's signature using bblAuthPublicKey, which is available in the account. If the signature is OK, the bankcard issuer opens the digital envelope of the AccountBankcardInfo segment 908, thus obtaining clear values of all attributes in the AccountInfo 909 and BankcardInfo 910 segments. To activate the account, the bankcard issuer first populates the Issuer 905 segment in the BBPAuthorities 904 segment and digitally signs the complete BBPAuthorities segment 907. It also populates the creditAccountLimit attribute. After that, the bankcard issuer envelopes the complete AccountBankcardInfo segment 908 with the BBP Ledger Server public key, available in the bblAuthPublicKey attribute, and then digitally signs the AccountBankcardInfo segment 911.

The AccountBalance segment 912 and the BBLAuthAccountBalanceSignature attribute 913 are not populated.

This virtual account object is returned to the BBP Ledger Server 301, who updates the Header segment 901 as follows: it sets the version attribute to 12 (one-two), indicating a permissioned account with a status "activated." The instanceID attribute is set to two (2), and the Server creates a hash of the previous instance of the same account (with status "opened") and populates with it the previousInstanceHash attribute. The Server also populates the accountDateTime attribute in the Header segment and digitally signs that segment 903.

The BBP Ledger Server writes 302 this virtual account into the BBP Ledger 303. Notification is returned to the cardholder 304.

In summary, if the virtual account represents a credit card and is therefore permissioned, (a) the Header segment is created and digitally signed by the BBP Ledger Server, (b) the BBPAuthorities and AccountBankcardInfo segments are created and digitally signed by the bankcard issuer, (c) two segments of the AccountBankcardInfo segment are enveloped using the BBP Ledger Server's public key, (d) the AccountBalance segment and the BBLAuthAccountBalanceSignature attribute are not populated, and (e) the account's financial data are validated by the bankcard issuer.

B. The Activation of a Merchant Virtual Account: all merchant accounts must be activated. Activation simply represents confirmation by the acquirer of the merchant's account object that its data, provided by the merchant during the Open Account Protocol, are correct.

After receiving the BBP Merchant Account object from the BBP Ledger Server 107, the acquirer first verifies the object's three signatures using the bblAuthPublicKey available in the account. If the signatures are OK, the acquirer opens the digital envelope of the MerchantAccountInfo segment 1108, thus obtaining clear values of all attributes in that segment.

To activate the account, the acquirer first digitally signs the BBPAuthorities segment 1107 and then completes the Acquirer segment 1105 in the BBPAuthorities segment 1104 and digitally signs that segment 1107. After that, the acquirer envelops the MerchantAccountInfo segment 1108 (with the exception of the merchantBIXID attribute) with the BBP Ledger Server's public key from the bblAuthPublicKey attribute, digitally signs that segment 1109, and returns the complete BBP Merchant Account object to the BBP Ledger Server 208.

The BBP Ledger Server updates the Header segment 1101 in the same way as for a cardholder's permissioned account: the version attribute is set to 12 (one-two), indicating a permissioned account with the status "activated". The instanceID attribute is set to two (2). The Server then creates a hash of the previous instance of the same account (with the status "opened"), populates with it the previousInstanceHash attribute, populates the accountDateTime attribute in the Header segment, and digitally signs that segment 1103.

The BBP Ledger Server then writes 205 this virtual account into the BBP Ledger 210. Notification is returned to the merchant 212.

2.3 The Payment Protocol

The purpose of the Payment Protocol is for the cardholder to pay the agreed upon amount of BIXCoins to the merchant using the transaction parties' respective virtual accounts. This protocol has three embodiments.

A. The Payment Protocol using a Standard Bankcard and POS Device: in this embodiment of the protocol, the cardholder uses a standard plastic bankcard 401 and the merchant uses a standard POS device 402. The cardholder swipes the bankcard's magnetic stripe or inserts the bankcard's chip into the POS device 403. The device already has all financial data related to the transaction and the merchant's account data. The device captures the bankcard's number and other data, required to create standard authorization request transaction.

After capturing the bankcard data, the POS device creates a standard authorization request message and sends it to the payment gateway with which it is connected 404. The payment gateway is extended with the BBP PG Agent and instead of passing the authorization request to the standard payment processor, it passes it to the BBP PG Agent 405.

The BBP PG Agent extract the transaction data, fetches the merchant's registration data from the BBP Ledger, and creates a BBP Payment Transaction object 406 using the following procedure:

The BankcardInfo segment 1201 is populated using the cardholder's bankcard data. Because the merchant's POS device does not have cryptographic capabilities, the BBP PG Agent receives the original form of the bankcard number and creates its hash. This segment is then enveloped using the BBP Ledger Server's public key, which the merchant has in his/her BBP Merchant Account.

MerchantAccountInfo segment 1202 is populated from the merchant's BBP virtual account, which was created with the Open Account Protocol. TxInitiator segment 1203 is populated with the registration data of the BBP PG Agent, because with this embodiment of the Payment Protocol, that Agent initiates the transaction.

The TxInfo segment 1204 is created as follows: txNumber is extracted from the standard merchant's authorization request message, txDateTime is set to the current date and time, txType is set to "payment," and txAmount is populated with the value specified in the merchant's authorization request message. With debit transactions, the settlementDateTime attribute is set to the same value as the value of the txDateTime attribute and the settlementEvent attribute is not populated.

The BBP PG Agent then digitally signs the BBP Payment Transaction 1205 and sends it to the BBP Ledger Server 407.

The BBP Ledger Server, upon receiving the transaction, fetches the most recent instance of the cardholder and merchant's respective virtual accounts from the BBP Ledger 408. Using the BBP Payment Transaction that was just received, it updates both virtual accounts as follows:

It first verifies the digital signature of the BBP Payment Transaction 1205 created by the BBP PG Agent. If OK, it then checks whether the cardholder's account has a sufficient balance to pay the amount indicated in the BBP Payment Transaction's txAmount attribute. If the cardholder's virtual account represents a debit card, then the value of the debitAccountBalance attribute in the AccountBalance segment 912/1012 must be greater than or equal to the payment amount. If the virtual account represents a credit card, then the amount must be less than the remaining credit; that is, the value of the creditAccountLimit attribute minus the value of the creditAccountBalance attribute in the AccountBalance segment. If the virtual account has a sufficient balance in the debitAccountBalance attribute or its credit limit has not been reached, the transaction is paid. In that process, hashes are first created from the current instances of the cardholder and merchant's respective accounts, and the three virtual accounts are updated.

As the result of the payment transaction, the cardholder's virtual account is updated as follows: the value of the instanceID attribute is increased by one. The previousInstanceHash attribute is set to the value of the hash of the current instance of the cardholder's account before the update, and the accountDateTime attribute is set to the value of the txDateTime attribute from the BBP Payment Transaction object. In that way, the new instance of the cardholder's account has the same date and time as the transaction that last updated it. The Header segment is then digitally signed by the BBP Ledger Server.

If the virtual account is a debit card account, the value of the debitAccountBalance attribute in the AccountInfo segment is debited by the payment amount. If the account is a credit card account, the value of the creditAccountBalance is incremented by the payment amount. After one of these updates, the AccountInfo segment is then digitally signed by the BBP Ledger Server.

The merchant's account is updated in the same way. The value of the instanceID attribute is increased by one, the previous InstanceHash attribute is set to the value of the hash of the current instance of the merchant's account before the update, and the accountDateTime attribute is set to the value of the txDateTime attribute from the BBP Payment Transaction object. In that way, the new instance of the merchant's account has the same date and time as the transaction that last updated it. The Header segment is then digitally signed by the BBP Ledger Server.

The MerchantAccountInfo segment is also updated: the lastTxNumber attribute is set to the value of txNumber from the BBP Payment Transaction and the value of the accountBalance attribute is increased by the txAmount from the BBP Payment Transaction object, minus the service fee. This updated MerchantAccountInfo segment is then signed by the BBP Ledger Server.

This protocol updates the virtual account of the BBP Ledger Server, which is equivalent to the BBP Merchant Account. Its lastTxNumber and accountBalance attributes are updated in the same way as the merchant's account, but with the amount of the service fee.

All three updated and digitally signed accounts are then written back 409 into the BBP Ledger 410/411/412.

After that, the BBP Ledger Server sends the copy of the new instance of the BBP Merchant Account object back to the BBP PG Agent 407. That Agent, after receiving the object 405 and verifying its digital signature, extracts parameters from that object, creates a standard authorization response message, and returns it to the merchant's POS device 413.

B. The Payment Protocol using a BBP ME Agent: in this embodiment of the protocol, the merchant's POS device is a mobile phone, tablet, or workstation with the software application (BBP ME Agent) and the bankcard (magnetic stripe or chip) reader attached to the device 502. In this embodiment, the cardholder provides his/her bankcard number to the merchant in the same way as in embodiment A 501. However, the BBP Payment Transaction 503 is not created by the BBP PG Agent but by the BBP ME Agent 502, which is directly linked to the BBP Ledger Server. This embodiment bypasses the payment gateway.

After accepting the bankcard data from the cardholder's bankcard and already having all the payment transaction data, the BBP ME Agent creates the BBP Payment Transaction in the same way as the how the BBP PG Agent created it in embodiment A. First, it fetches two latest instances of the cardholder and merchant's virtual accounts from the BBP Ledger, verifies the digital signatures of the two accounts, and if they are OK, creates the BBP Payment Transaction object 503 with the following procedure:

The BankcardInfo segment 1201 is populated using the cardholder's bankcard data. The merchant is using the BBP ME Agent, which uses the original form of the bankcard number and creates its hash. This segment is then enveloped using the BBP Ledger Server's public key, which the merchant has in his/her BBP Merchant Account.

MerchantAccountInfo segment 1202 is populated from the merchant's virtual account created with the Open Virtual Account Protocol. The TxInitiator segment 1203 is populated with the registration data of the BBP ME Agent, because with this embodiment of the protocol, that Agent initiates the transaction.

The TxInfo segment 1204 is created in the same way as in embodiment A.

This BBP Payment Transaction object is digitally signed by the BBP ME Agent and submitted to the BBP Ledger Server 504. In this embodiment of the protocol, the BBP Payment Transaction is processed by the BBP Ledger Server in the same way as in embodiment A. The virtual account object of the BBP Ledger Server is also fetched from the BBP Ledger 505 and updated with the transaction fee. The updated AccountBalance segment is digitally signed by the BBP Ledger Server.

All three updated and digitally signed accounts are written 506 into the BBP Ledger 507/508/509.

After that, BBP Ledger Server sends the copy of the new instance of the BBP Merchant Account object back to the BBP ME Agent 510, who displays it to the merchant as an authorization response message.

C. The Payment Protocol using the BBP Wallet: in this embodiment of the protocol, the cardholder does not give the plastic bankcard (and therefore does not give bankcard data) to the merchant, but the merchant transfers the transaction data to the cardholder's BBP Wallet 601. At a minimum, this data includes the transaction number, the merchant identity, and the payment amount. This transfer can be performed by various proximity wireless protocols, such as scanning the Quick Response (QR) code displayed by the BBP ME Agent, the Bluetooth protocol, the NFC protocol, or SMS message.

After accepting the transaction data and already having all the cardholder's bankcard data as the result of the cardholder's Open Virtual Account Protocol, the BBP Wallet creates the BBP Payment Transaction 602 in the same way as how the BBP ME Agent created it in embodiment B.

This BBP Payment Transaction object is digitally signed by the BBP Wallet and submitted to the BBP Ledger Server 603. Processing of the three virtual accounts is done in the same way. After being processed and digitally signed by the BBP Ledger Server, the new instances of the three virtual accounts are written back 604 into the BBP Ledger 605/606/607.

Finally, the BBP Ledger Server sends a copy of the new instance of the BBP Cardholder Account back to the BBP Wallet 608 and the new instance of the BBP Merchant Account to the BBP ME Agent 609. The messages are displayed as the payment confirmation (receipt to the cardholder and as an authorization response to the merchant.

2.4 The Update Virtual Account Protocol

The purpose of the Update Virtual Account Protocol is to update the cardholder's virtual account. Four types of actions can be performed with this protocol.

For virtual accounts that represent debit cards, two types of updates can be performed: (a) increasing the value of the debitAccountBalance attribute by buying more virtual currency, BIXCoin, and loading it into the virtual account representing debit card and (b) reducing the amount of BIXCoin virtual currency in the virtual debit account by converting some of it back to real-world currency. The update (a) must be performed because the value of the debitAccountBalance attribute is continuously reduced with payment transactions, so when the debit account balance is low or exhausted, it must be replenished.

With virtual accounts representing credit cards, two types of actions can be performed with this protocol. One is modification of the value of the creditAccountLimit attribute in cases when the bankcard issuer changes the cardholder's credit limit. The other one is the update of the value of the creditAccountBalance attribute when the cardholder pays all or part of his/her debt.

A. Loading Debit Balance in the Cardholder Virtual Account: this action of the Update Virtual Account Protocol is initiated by the cardholder using the BBP Wallet 701 and a special form of the BBP Payment Transaction. In that transaction, the attributes in the BankcardInfo segment 1201 indicate the debit card with which the account is associated. The segment is enveloped using the BBP Ledger Server's public key. MerchantAccountInfo segment 1202 for this protocol is populated with values designating the cardholder, because in this transaction, the cardholder is the receiver of the virtual currency. The same is true for the TxInitiator segment 1203, because the cardholder initiates the transaction. In the TxInfo segment 1204, the txNumber attribute is set to a random number, the txDateTime attribute is set to the current date and time, the value of the txType attribute is set to "load," and the value of the txAmount attribute is set to the amount of virtual currency that the cardholder wants to load into the account. settlementDateTime and settlementEvent are not set. After creating such BBP Payment Transaction object, the cardholder digitally signs it and submits to the BBP Ledger Server 702.

The BBP Ledger Server initiates financial transaction with the financial institution where the cardholder has real-world account supporting debit virtual account 703, which results in the transfer of real-world currency from the real-world account of the cardholder to the real-world account of the BBP Ledger Server 704. Upon receiving notification that the transfer has been successfully completed, the BBP Ledger Server fetches the latest instance of the cardholders' virtual account object 705, creates new Header for it, updates its debitAccountBalance attribute, digitally signs it, and writes it back to the BBP Ledger 706. This action creates a new instance of the cardholder's virtual account 707, which is linked with the previous instance of the same virtual account 708 and, in that way, is added to the tail of the cardholder's bankcard account chain.

A service fee is charged as a percentage of the loaded virtual currency and assigned to the virtual account of the BBP Ledger Server 709.

B. Unloading Debit Balance of the Cardholder Virtual Account: this action is also initiated by the cardholder using the BBP Wallet and another special form of the BBP Payment Transaction object. This action is in reverse of the loading account action. The value of the txType attribute is set to "unload," and the value of the txAmount attribute is set to the amount of virtual currency that the cardholder wants to unload from the account. The action with real-world accounts is also reversed—the indicated amount of virtual currency is removed from the BBP system and the equivalent amount of real-world currency is transferred from the real-world account of the BBP Ledger Server to the real-world account of the cardholder.

A service fee is charged as a percentage of the unloaded virtual currency and assigned to the virtual account of the BBP Ledger Server.

C. Updating the Credit Card Limit of the Cardholder Virtual Account: this action is initiated by the cardholder but the update must be approved by the bankcard issuer. The cardholder creates a special type of BBP Payment Transaction object by setting txType to "update" and txAmount to the proposed/requested new credit card limit. All other attributes in the BBP Payment Transaction object are then populated. The cardholder sends the digitally signed form of this BBP Payment Transaction object to the BBP Ledger Server, which forwards the request to the bankcard issuer. If the request is approved, the BBP Ledger Server fetches the latest instance of the BBP Cardholder Account object from the BBP Ledger, updates the value of the creditAccountLimit attribute, and writes the new instance of the cardholder's account back into the ledger.

D. Paying the Credit Card Balance: this action is initiated by the cardholder when the cardholder wants to pay the credit card balance accumulated in the virtual account. This action is also performed by creating a special form of the BBP Payment Transaction object. The value of the txType attribute is set to "credit," and the value of the txAmount attribute is set to the amount of real-world currency that the cardholder wants to pay for his/her credit debt. The BBP Wallet envelopes the BankcardInfo segment with BBP Ledger Server's public key, digitally signs the transaction, and sends it to the BBP Ledger Server.

The BBP Ledger Server initiates the financial transaction with the bankcard issuer, which results in the transfer of real-world currency from the real-world account of the cardholder to the real-world account of the bankcard issuer. Upon receiving notification that the transfer has been successfully completed, the BBP Ledger Server fetches the cardholder's virtual account object, creates a new Header for it, updates its creditAccountBalance attribute, digitally signs it, and writes it back to the BBP Ledger. This action creates a new instance of the cardholder's virtual account, which is linked with the previous instance of the same virtual account and, in that way, is added to the tail of the cardholder's bankcard account chain.

E. Updating the Balance of the Merchant Virtual Account: Merchants may use BIXCoins to pay to other members of the BBP system. But, if they need real-world currency, they may destroy (cash out) a certain amount of the virtual currency from their virtual account. That action can be performed by sending request to the BBP Ledger Server 801, which creates an updated instance of the merchant's account and adds it to the BBP Ledger 802.

3. Security Privacy, and Anonymity

The described BBP Ledger provides an effective mechanism for merchants to verify that payment transactions are authorized and initiated by legitimate cardholders, who use their own bankcards and are registered and approved by their respective financial institutions. The ledger provides these features using (a) digital objects, which represent virtual accounts and payment transactions that are cryptographically encapsulated, guaranteeing their correctness, protection, and verifiability and (b) triple-bonded chains comprising instances of accounts into which the entries can only be added with append-only actions; the entries cannot be inserted or removed, even by system participants, as to do so would constitute illegal manipulation.

In addition, the system described for embodiment C of the Payment Protocol provides cardholder security, privacy, and anonymity. Security means that bankcard numbers cannot be stolen and illegally used. Privacy means that merchants cannot distribute information about cardholder transactions to any other party, whether inside or outside of the BIX system. Anonymity means that even merchants cannot recognize the cardholder who makes a payment. Anonymity is also extended with untraceability. Merchants cannot recognize that two transactions, that originated by the same cardholder, are linked to the same cardholder. That is, merchants cannot link cardholders to their multiple transactions.

3.1 The Integrity of the BBP Ledger

From the structure of the BBP Payment Transaction object and virtual account objects (cardholder, merchant, and BBP Ledger Server), it is clear that they are mutually linked and interrelated. Each payment transaction has its transaction ID, which is included in and links all three new instances of the three virtual accounts that are updated with each payment transaction. This linking, created by processing the same payment transaction, means that the instances of the three virtual accounts (the cardholder's account, merchant's account, and BBP Ledger Authority's account) modified in the course of processing a single transaction represent a cross-slice of the bankcard ledger, i.e., three financial chains that belong to the same entity 1301/1302/1303. The relationships between one payment transaction and the three affected virtual accounts are shown in FIG. 13.

Furthermore, the successive instances of virtual account objects that belong to the same party (a cardholder, for example) are also mutually linked in time and financial sequences using linked hash values 1304/1305. Because the objects are also digitally signed, it is clear that (a) their content is guaranteed and its correctness can be verified, (b) their content cannot be changed after they are inserted into the BBP Ledger, and (c) new instances of virtual accounts can only be added to the end of the chains, not inserted into them.

This means that it is not possible for a cardholder to cheat the system by attempting to modify (reduce) the value of the debitAccountBalance or creditAccountBalance attributes or to increase the value of the creditAccountLimit attribute, because the values of these three attributes are included in the AccountBalance segment, which is digitally signed by the BBP Ledger Server after each transaction. Even if these modifications were possible, they would also require the modification of other objects included in the cross-slice of the modified account objects. At that point, the cross-slice in question and, therefore, the ledger itself beyond the modified cross-slice would become incorrect, implying that the rest of the ledger must also be illegally modified.

This analysis clearly shows that illegal modifications of individual instances of virtual account objects are impossible. This implies that by their construction and cryptographic encapsulation (digital signing), individual entries and the overall ledger are always correct and always represent the true state of all accounts therein.

3.2 The Security of Cardholders' Bankcard Accounts

For the security and protection of bankcard numbers, it is important to emphasize that bankcard account numbers do not exist in a clear form anywhere in the BBP system and, therefore, cannot be stolen and illegally used.

First, bankcard numbers are strongly cryptographically protected in the BBP Ledger. Bankcard numbers are included in the BankcardInfo segment of the cardholder's virtual account, not as clear, original numbers but as hashes of these numbers. Thus, bankcard numbers are protected by the Proof-of-Existence Protocol. Only the entity in possession of the original bankcard number can create its hash, and that entity is always the cardholder.

Second, even the hashes of bankcard numbers in the AccountInfo segment are protected by cryptographic enveloping. For that, the protection public key of the BBP Ledger Server is used, so that only the BBP Ledger Server can open the digital envelope and access the hash of the bankcard number. In other words, even hashes of bankcard numbers cannot be stolen and illegally used.

Third, in embodiment C of the Payment Protocol, the cardholder creates a BBP Payment Transaction object and includes the BankcardInfo segment. However, that segment is also enveloped with the BBP Ledger Server's public key, so is accessible only to the authorized BBP Ledger Server.

The digitally enveloped hash of the bankcard number of a cardholder's virtual account, which is used for payment transactions, represents the second security service applied to the hashes of bankcard numbers—authorization of their use. Only authorized BBP Ledger Servers can open digital envelopes in virtual accounts and payment transactions and access the hashes of bankcard numbers.

Finally, each BBP Payment Transaction is also signed by its initiator. In embodiment C of the Payment Protocol, that initiator is the BBP Wallet, which initiates on behalf of the cardholder who owns the bankcard. This represents Proof-of-Ownership, which is the fourth security service applied to bankcard numbers.

Even the BBP Ledger Server, who has access to the clear BankcardInfo data after opening the digital envelope, cannot illegally use the bankcard hash for unauthorized transactions. If the BBP Ledger Server were malicious and tried to make a payment transaction to his/her own account using a cardholder's bankcard hash, it could not do so because it does not possess the appropriate private key to sign the transaction. The private key to sign such a transaction must correspond to the public key in the initiatorPublicKey attribute of the TxInitiator segment. To steal money from a cardholder's virtual account, that segment must specify initiatorBIXID of the victim cardholder. Therefore, the public key in the initiatorPublicKey attribute must be the public key of the victim cardholder. The lack of corresponding private key makes such illegal transaction impossible.

These security services all depend on the strong protection of the cardholder's private key, because in the case of it being stolen, the security of the bankcard number would be lost. The solution to this problem is described in the next section.

3.3 The Security of Cardholders' Private Cryptographic Keys

The BBP system is completely resistant to any penetration and illegal use by unauthorized users who may attempt to steal the secret or sensitive parameters of regular BBP users, the cardholders. The core cryptographic mechanism of the BBP system is public key cryptography. In all algorithms of that type, the sensitive and therefore secret element is a private key of the cardholder. If the private key is stolen, the intruder can steal the cardholder's bankcard data. Such an illegal action would be executed as a payment transaction where the intruder would have two roles—as the cardholder, using BBP Cardholder Account of the victim, and also as the merchant, using his/her own virtual account as a BBP Merchant Account.

Many different suggestions and solutions for this problem exist in the literature, but they all have the same approach: protection of the private key by different security mechanisms. However, all such mechanisms, even if based on the use of smart cards, are not perfect and can be either bypassed or broken.

To effectively eliminate this threat, the obvious solution is not to store private keys anywhere in the system. The logic of this approach is simple: if a private key does not exist, it cannot be stolen. However, if a private key does not exist in the system, then it must be generated when needed to create digital signatures or to open digital envelopes. However, a new private key cannot be generated whenever it is needed, because the corresponding public key and its certificate have already been distributed and are in possession of many BBP Ledger Servers. Therefore, the solution used in the BBP system is that a private key is generated when needed but in such a way that it cryptographically corresponds to the public key/certificate already in the system. This can be accomplished using a deterministic procedure to generate a key pair, with the seed represented by the personal secret parameter memorized by the user and not stored in the system.

For two of the most popular asymmetric cryptographic algorithms, the generation of a key pair is a deterministic procedure. For the Rivest-Shamir-Adleman (RSA) cryptographic algorithm, two prime numbers are generated first, then the modulus, then the private key (based on the convention that the value of the public key exponent is fixed and equal to 3 or 17). The procedure for generating two prime numbers is deterministic if it uses the seed. Using the user's login parameter (which has a fixed value) for that seed always generates the same key pair. The Elliptic Curve Digital Signature Algorithm (ECDSA) procedure is even simpler, as the private key in that algorithm is any random value selected in a specified interval. That random value can be easily generated deterministically using the fixed seed.

To conclude, this innovative way to protect private cryptographic keys is that when a cardholder logs into the BBP Wallet, he/she gives his/her login parameter. This parameter is used as the seed to generate a private key, and that key is then used to access the local cardholder's bankcard data, in a challenge/response authentication protocol to authenticate the cardholder, to create digital signatures when initiating payment transactions, and to open digital envelopes for receiving messages.

3.4 Cardholder Privacy and Anonymity

With embodiment C of the Payment Protocol, cardholder privacy and anonymity are guaranteed. It also provides untraceability.

The privacy of cardholders and their transactions is defined as a property of the system by which it does not disclose user identities to any party other than the current merchant. This property means that cardholder identity cannot be shared with any other party and that the payment transaction between the two parties does not reveal the identities of the parties to any other party in the system. Anonymity goes beyond privacy in that even the merchant participating in the payment transaction does not learn the identity of the cardholder, and untraceability is even stronger than anonymity. With untraceable transactions, the merchant cannot even recognize that two transactions initiated by the same cardholder are performed by the same cardholder.

As previously described, in embodiment C of the Payment Protocol, the merchant passes transaction data to the cardholder through his/her BBP Wallet. In that action, the merchant does not learn the identity of the cardholder and his/her bankcard number. After the transaction is approved, an authorization message is returned to the merchant in the form of his/her updated BBP Merchant Account. In that account, the value of the lastTxNumber attribute is the exact transaction number that originated from the merchant, so that the merchant can recognize that the new instance of the merchant's virtual account represents a payment (in the case of a debit) or payment authorization (in the case of credit). The new value of the accountBalance attribute is used by the merchant to validate that the correct amount has been paid.

It should be noted that the BBP Merchant Account object does not contain any indication of which cardholder and/or which bankcard is used for any given payment.

I claim:

1. A bankcard payment system for executing electronic payment transactions, comprising:
   a bankcard encoded with electronic identification data corresponding to a cardholder virtual account, wherein the cardholder virtual account comprises a cryptographically-encapsulated bankcard object and includes a balance of virtual currency;
   a point-of-sale device associated with a merchant, the point-of sale device comprising electronic identification data corresponding to a merchant virtual account wherein the merchant virtual account comprises a cryptographically-encapsulated merchant object, wherein the point-of-sale device is operable to retrieve the electronic identification data corresponding to the cardholder virtual account from the bankcard in response to a user engaging the bankcard with the point-of-sale device for initiating a payment transaction between the cardholder virtual account and the merchant virtual account, and wherein the point-of-sale device is further operable to transmit standard transaction data corresponding to the payment transaction to a payment gateway; and
   a plurality of bankcard ledger servers each comprising a plurality of account chains corresponding to a plurality of cardholder virtual accounts and a plurality of merchant virtual accounts, the bankcard ledger server operable to receive unique transaction objects via a payment agent operatively connected to the payment gateway, wherein each bankcard ledger server is further operable to:
      in response to receiving a unique transaction object from the payment agent wherein the unique transaction object is generated at the payment gateway based on the standard transaction data, retrieve most recent instances of both the cardholder virtual account and the merchant virtual account from the plurality of account chains;
      modify the most recent instances of both the cardholder virtual account and the merchant virtual account to include transaction details corresponding to the standard transaction data, thereby generating a modified cardholder virtual account instance and a modified merchant virtual account instance, wherein the transaction details comprise a particular amount of virtual currency from the cardholder virtual account to be transferred to a balance of virtual currency associated with the merchant virtual account;
      generate digitally-signed instances of both the modified cardholder virtual account and the modified merchant virtual account; and
      insert the digitally-signed instances of the modified cardholder virtual account and the modified merchant virtual account into respective account chains in each bankcard ledger server, wherein the respective account chains comprise forwardly-linked lists of the cardholder virtual accounts and the merchant virtual accounts.

2. The bankcard payment system of claim 1, wherein the payment gateway receives a plurality of payment transactions from a plurality of merchant point-of-sale devices, each transaction comprising unique standard transaction data.

3. The bankcard payment system of claim 1, wherein each bankcard ledger server is further operatively connected to a plurality of financial institutions.

4. The bankcard payment system of claim 1, wherein the virtual currency is pegged to a fiat currency.

5. The bankcard payment system of claim 1, wherein the cryptographically-encapsulated bankcard object is cryptographically-encapsulated and digitally-signed using private and public cryptographic keys.

6. The bankcard payment system of claim 1, wherein each bankcard ledger server further comprises a plurality of authority account instances corresponding to an authority account, wherein the authority account comprises a sum of fees collected in association with a transaction history in the plurality of account chains.

7. A bankcard payment system for executing electronic payment transactions, comprising:
   a bankcard encoded with electronic identification data corresponding to a cardholder virtual account, wherein the cardholder virtual account comprises a cryptographically-encapsulated bankcard object and includes a balance of virtual currency;
   a payment agent at a merchant payment workstation comprising electronic identification data corresponding to a merchant virtual account wherein the merchant virtual account comprises a cryptographically-encapsulated merchant object, wherein the payment agent is operable to retrieve the electronic identification data corresponding to the cardholder virtual account from the bankcard in response to a user engaging the bankcard with the merchant workstation for initiating a payment transaction between the cardholder virtual account and the merchant virtual account, the payment agent further operable to generate a unique transaction object from standard transaction data representative of the payment transaction between the cardholder virtual account and a merchant virtual account; and
   a plurality of bankcard ledger servers comprising a plurality of account chains corresponding to a plurality of cardholder virtual accounts and a plurality of merchant virtual accounts, each bankcard ledger server operable to receive the unique transaction object from the payment agent, wherein each bankcard ledger server is further operable to:
      in response to receiving the unique transaction object from the payment agent, retrieve most recent instances of both the cardholder virtual account and the merchant virtual account from the plurality of account chains;
      modify the most recent instances of both the cardholder virtual account and the merchant virtual account to reflect transaction details corresponding to the standard transaction data, thereby generating a modified cardholder virtual account instance and a modified merchant virtual account instance, wherein the transaction details comprise a particular amount of virtual currency from the cardholder virtual account to be transferred to a balance of virtual currency associated with the merchant virtual account;
      generate digitally-signed instances of both the modified cardholder virtual account and the modified merchant virtual account; and
      insert the digitally-signed instances of the modified cardholder virtual account and the modified merchant virtual account into respective account chains in each bankcard ledger server, wherein the respective account chains comprise forwardly-linked lists of the cardholder virtual accounts and the merchant virtual accounts.

8. The bankcard payment system of claim 7, wherein the payment gateway receives a plurality of payment transactions from a plurality of merchants, each transaction comprising unique standard transaction data.

9. The bankcard payment system of claim 7, wherein each bankcard ledger server is further operatively connected to a plurality of financial institutions.

10. The bankcard payment system of claim 7, wherein the virtual currency is pegged to a fiat currency.

11. The bankcard payment system of claim 7, wherein the cryptographically-encapsulated bankcard object is cryptographically-encapsulated and digitally-signed using private and public cryptographic keys.

12. The bankcard payment system of claim 7, wherein each bankcard ledger server further comprises a plurality of authority account instances corresponding to an authority account, wherein the authority account comprises a sum of fees collected in association with a transaction history in the plurality of account chains.

13. A digital bankcard payment system for executing electronic payment transactions, comprising:
- a mobile computing device associated with a digital bankcard, the digital bankcard representative of electronic identification data corresponding to a cardholder virtual account, wherein the cardholder virtual account comprises a cryptographically-encapsulated bankcard object and includes a balance of virtual currency;
- a payment agent at a merchant payment workstation, the payment agent comprising electronic identification data corresponding to a merchant virtual account wherein the merchant virtual account comprises a cryptographically-encapsulated merchant object, and wherein in response to a user initiating a transaction between the cardholder virtual account and the merchant virtual account, the payment agent transmits standard transaction data to the mobile computing device; and
- a plurality of bankcard ledger servers comprising a plurality of account chains corresponding to a plurality of cardholder virtual accounts and a plurality of merchant virtual accounts, each bankcard ledger server operable to receive a unique transaction object from the mobile computing device, the unique transaction object generated by the mobile computing device from the standard transaction data, wherein each bankcard ledger server is operable to:
  - in response to receiving the unique transaction object from the mobile computing device, retrieve most recent instances of both the cardholder virtual account and the merchant virtual account from the plurality of account chains;
  - modify the most recent instances of both the cardholder virtual account and the merchant virtual account to include transaction details corresponding to the standard transaction details, thereby generating a modified cardholder virtual account instance and a modified merchant virtual account instance, wherein the transaction details comprise a particular amount of virtual currency from the cardholder virtual account to be transferred to a balance of virtual currency associated with the merchant virtual account;
  - generate digitally-signed instances of both the modified cardholder virtual account and the modified merchant virtual account; and
  - insert the digitally-signed instances of the modified cardholder virtual account and the modified merchant virtual account into respective account chains in each bankcard ledger server, wherein the respective account chains comprise forwardly-linked lists of the cardholder virtual accounts and the merchant virtual accounts.

14. The digital bankcard payment system of claim 13, wherein each bankcard ledger server is further operatively connected to a plurality of financial institutions.

15. The digital bankcard payment system of claim 13, wherein the virtual currency is pegged to a fiat currency.

16. The digital bankcard payment system of claim 13, wherein the cryptographically-encapsulated bankcard object is cryptographically-encapsulated and digitally-signed using private and public cryptographic keys.

17. The digital bankcard payment system of claim 13, wherein each bankcard ledger server further comprises a plurality of authority account instances corresponding to an authority account, wherein the authority account comprises a sum of fees collected in association with a transaction history in the plurality of account chains.

* * * * *